(12) United States Patent
Walsh

(10) Patent No.: US 11,308,566 B2
(45) Date of Patent: Apr. 19, 2022

(54) ANONYMOUS PRICE AND PROGRESSIVE DISPLAY EXECUTION APPARATUS, SYSTEM AND METHOD

(71) Applicant: William F. Walsh, Basking Ridge, NJ (US)

(72) Inventor: William F. Walsh, Basking Ridge, NJ (US)

( * ) Notice: Subject to any disclaimer, the term of this patent is extended or adjusted under 35 U.S.C. 154(b) by 393 days.

(21) Appl. No.: 14/697,607

(22) Filed: Apr. 27, 2015

(65) Prior Publication Data

US 2015/0242973 A1 Aug. 27, 2015

Related U.S. Application Data

(63) Continuation-in-part of application No. 13/567,269, filed on Aug. 6, 2012.

(Continued)

(51) Int. Cl.
| | | |
|---|---|---|
| *G06Q 50/18* | (2012.01) | |
| *G06Q 40/04* | (2012.01) | |
| *G06Q 20/38* | (2012.01) | |

(52) U.S. Cl.
CPC ......... *G06Q 50/188* (2013.01); *G06Q 20/383* (2013.01); *G06Q 40/04* (2013.01)

(58) Field of Classification Search
CPC ..... G06Q 50/188; G06Q 20/383; G06Q 40/04
(Continued)

(56) References Cited

U.S. PATENT DOCUMENTS 5,884,272 A * 3/1999 Walker ............... G06Q 30/0615
379/93.12
7,565,313 B2 * 7/2009 Waelbroeck ....... G06Q 30/0251
700/99

(Continued)

OTHER PUBLICATIONS

"Protocols for automated negotiations with buyer anonymity and seller reputations," by Lorrie Faith Cranor and Paul Resnick. Netnomics 2, 1-23 (Jan. 2000). Accessed via SpringerLink. Abstract only. (Year: 2000).*

*Primary Examiner* — Sara C Hamilton
(74) *Attorney, Agent, or Firm* — Ference & Associates LLC; John W Goldschmidt, Jr.

(57) ABSTRACT

An apparatus, system and method for buying, selling, and/or trading certain items in certain markets (such as, by way of non-limiting example, trading financial instruments) which offers a balance between complete multi-lateral anonymity amongst trading participants while retaining key information, and only making needed information involving historic and linked counter-party data available in a manner which discloses relevant information to the appropriate parties at the appropriate time is disclosed. The apparatus, system and method may comprise a electronic and/or computerized system for buying and selling of products, services, financial instruments including, but not limited to, securities, derivatives, commodities, liabilities, and/or other items which may be bought, sold and/or traded while maintaining the integrity of the markets in which such items are bought, sold and/or traded. The apparatus, system and method may allow for the progressive disclosure of information related the potential execution of product by establishing an anonymous alias and registering an interest in a proposed transaction based upon information that is both constructed by the alias and combined with information that is maintained and linked within a central facility wherein some or all such information (Continued)

within the central facility may be disclosed at an appropriate or desired time as the warranted by the situation related to a transaction.

11 Claims, 28 Drawing Sheets

Related U.S. Application Data

(60) Provisional application No. 61/574,600, filed on Aug. 5, 2011.

(58) Field of Classification Search
USPC .......................................................... 705/37
See application file for complete search history.

(56) References Cited

U.S. PATENT DOCUMENTS

| | | | | |
|---|---|---|---|---|
| 7,680,715 B2* | 3/2010 | Waelbroeck | .......... | G06Q 40/04 |
| | | | | 705/35 |
| 7,827,085 B1* | 11/2010 | Hochenberger | ....... | G06Q 40/04 |
| | | | | 705/37 |
| 7,991,645 B2* | 8/2011 | Jain | ........................ | G06Q 30/08 |
| | | | | 705/26.1 |
| 2002/0055901 A1* | 5/2002 | Gianakouros | ........ | G06Q 10/109 |
| | | | | 705/37 |
| 2002/0133365 A1* | 9/2002 | Grey | ...................... | G06Q 30/02 |
| | | | | 705/7.29 |
| 2003/0004859 A1* | 1/2003 | Shaw | ..................... | G06Q 40/04 |
| | | | | 705/37 |
| 2003/0083973 A1* | 5/2003 | Horsfall | ................. | G06Q 40/00 |
| | | | | 705/37 |
| 2004/0260653 A1* | 12/2004 | Tsuei | ................. | G06Q 20/4037 |
| | | | | 705/54 |
| 2005/0234805 A1* | 10/2005 | Robertson | .............. | G06Q 40/04 |
| | | | | 705/37 |
| 2005/0240513 A1* | 10/2005 | Merold | ................... | G06Q 40/04 |
| | | | | 705/37 |
| 2005/0283426 A1* | 12/2005 | Krishnasami | .......... | G06Q 40/06 |
| | | | | 705/37 |
| 2006/0031157 A1* | 2/2006 | Gianakouros | .......... | G06Q 40/04 |
| | | | | 705/37 |
| 2006/0059082 A1* | 3/2006 | Silverman | .............. | G06Q 40/00 |
| | | | | 705/37 |
| 2006/0259391 A1* | 11/2006 | Schoen | ................... | G06Q 40/04 |
| | | | | 705/37 |
| 2007/0005484 A1* | 1/2007 | Waelbroeck | ........... | G06Q 40/00 |
| | | | | 705/37 |
| 2007/0233594 A1* | 10/2007 | Nafeh | ..................... | G06Q 40/00 |
| | | | | 705/37 |
| 2008/0052244 A1* | 2/2008 | Tsuei | ................... | G06Q 20/383 |
| | | | | 705/74 |
| 2008/0270258 A1* | 10/2008 | Brown | ................... | G06Q 50/28 |
| | | | | 705/26.42 |
| 2009/0307121 A1* | 12/2009 | Lutnick | .................. | G06Q 40/04 |
| | | | | 705/37 |
| 2010/0082500 A1* | 4/2010 | Lutnick | .................. | G06Q 40/06 |
| | | | | 705/36 R |
| 2011/0047040 A1* | 2/2011 | Carlson | ................ | G06Q 20/385 |
| | | | | 705/26.1 |
| 2013/0103563 A1* | 4/2013 | Walsh | .................... | G06Q 40/04 |
| | | | | 705/37 |

* cited by examiner

ANONYMOUS PRICE AND PROGRESSIVE DISPLAY EXECUTION APPARATUS, SYSTEM AND METHOD

CROSS REFERENCE TO RELATED APPLICATIONS

This application is a continuation-in-part application and claims the priority of U.S. patent application Ser. No. 13/567,269, filed on Aug. 6, 2012, entitled "ANONYMOUS PRICE AND PROGRESSIVE DISPLAY EXECUTION SYSTEM" which claims the priority of U.S. Provisional Patent Application Ser. No. 61/574,600, filed on Aug. 5, 2011, entitled "ANONYMOUS MULTI-LATERAL ELECTRONIC PRICE AND INFORMATION DISCOVERY MECHANISM PROGRESSING TOWARDS THE BI-LATERAL NEGOTIATION AND EXECUTION OF FINANCIAL SECURITIES AND AGREEMENTS," the entirety of all of which are incorporated herein by reference.

FIELD OF THE INVENTION

This invention relates generally to buying and selling of products, services, financial instruments including, but not limited to, securities, derivatives, commodities, liabilities, and/or other items which may be bought, sold and/or traded while maintaining the integrity of the markets in which such items are bought, sold and/or traded.

BACKGROUND OF THE INVENTION

While transparency in certain markets, including but not limited to financial markets may be desirable in general, some markets may not be well-served with greater transparency. For example, the nature of the Over the Counter ("OTC") derivative markets tends to dictate that information leakage may adversely affect the functioning and the very existence of the marketplace. This is because OTC derivative transactions are usually used to the hedge large investment exposures by institutions, and any public knowledge of such exposures open institutions to predatory trading practices in related securities in order to profit from the knowledge of such exposures. As such, these markets are built upon intermediaries who preserve anonymity and use care and discretion to disclose transaction information in order to arrange for firms to transact directly with each other to minimize the leakage of information to the broader market associated with the transaction.

The OTC markets have traditionally been organized around one or more dealers who make markets by providing bid and offer quotes to market participants. The quotes and the negotiation of execution prices are generally conducted over the telephone, although the process may be enhanced through the use of electronic bulletin boards by the dealers for posting their quotes. The process of negotiating by phone, whether end-user-to-dealer or dealer-to-dealer is known as bilateral trading because only the two market participants directly observe the quotes or execution. Pure voice brokerage provides multiple market participants with the ability to obtain, evaluate and execute against multiple bids or offers on the other side of the market.

OTC derivatives markets also make use of electronic brokering platforms. These electronic brokering platforms are analogous to the electronic trading platforms used by exchanges where bid and offer quotes are displayed. The ultimate goal is to create a multilateral trading environment. However, at this time, electronic platforms are primarily used by brokers and dealers and much less by end-users. These systems allow dealers to post brokered interests, facilitating pre-trade price discovery. Furthermore, these systems are not click-and-trade and traders still need to telephone to generate a trade. Finally, live tradable prices are not feasible for large segments of the market because either too much or too little information is available in order to determine the appropriate price. Although the market may be evolving toward multi-broker electronic platforms where participants may send Requests for Quotes ("RFQ's") to multiple dealers, not all RFQs are seen by all participants. Typically, the RFQ is the basis for generating interest in the market, and responding dealers may submit a price or bid taking into account the size of the trade, the counter party's credit rating, and other such information. The client initiating the RFQ may then click and trade within a set time with any responding dealer.

However, several shortcomings of the current RFQ systems include the inability of such systems to offer the correct balance between complete multi-lateral anonymity amongst participants while retaining key information, and only making needed information involving historic and linked counter-party data available in a manner which discloses relevant information to the appropriate parties at the appropriate time.

Thus, there exists a need for a system and method for buying, selling, and/or trading certain items in certain markets, such as, by way of non-limiting example, trading financial instruments, which offers the correct balance between complete multi-lateral anonymity amongst trading participants while retaining key information, and only making needed information involving historic and linked counter-party data available in a manner which discloses relevant information to the appropriate parties at the appropriate time.

SUMMARY OF THE INVENTION

The present invention relates to an apparatus, system and method for buying, selling, and/or trading certain items in certain markets (such as, by way of non-limiting example, trading financial instruments) which offers the correct balance between complete multi-lateral anonymity amongst trading participants while retaining key information, and only making needed information involving historic and linked counter-party data available in a manner which discloses relevant information to the appropriate parties at the appropriate time.

In one embodiment, the present invention relates to an apparatus, system and method for the sale and/or purchase of one or more financial packages that may comprise one or more securities, derivatives, commodities, liabilities and/or other financial instruments. In certain embodiments of the invention, such financial packages may comprise one or more payout formulas containing one or more securities, and/or one or more measurable index instruments, and/or one or more reference statistics, and/or one or more technical management facilities that facilitate the execution of financial arrangements and/or securities. Such financial packages may be offered through an alias by an entity or entities such that the obligations contained therein are either directly or indirectly purchased by another entity or entities.

In one embodiment, the apparatus, system and method of the present invention may comprise an electronic and/or computerized execution management system that aggregates, reports, and analyzes the performance of and/or other information related to a package of assets and/or liabilities.

The apparatus, system and method may also facilitate the electronic communication of such information from an alias to a number of aliases such that a subset of the information associated with each alias and/or financial package may be linked and/or made available to one or more of the other aliases at discrete points during one or more trading sessions. Such information or subset thereof may be automatically and/or semi-automatically disseminated to such one or more aliases by an electronic and/or computerized execution management system and/or central management facility, and/or controlled automatically and/or manually by each entity. The execution management system and/or central management facility may also provide the ability for the aliases to progressively disclose and access such information in order to link and determine the suitability of certain combinations of aliases, packages, financial instruments, and/or entity characteristics to buy or sell certain alias, packages, financial instruments, and/or entity characteristics with one or more other entities. It is notable that certain characteristics may or may not be altered by the electronic and/or computerized facility, and/or by the controlling entity and disclosed again at defined points during one or more trading sessions within the disclosure process.

In certain embodiments the apparatus, system and method of this invention may comprise an apparatus, system and method for buying and selling of products, services, financial instruments including, but not limited to, securities, derivatives, commodities, liabilities, and/or other items which may be bought, sold and/or traded while maintaining the integrity of the markets in which such items are bought, sold and/or traded. The present invention further relates to an apparatus, system, and method which, in certain non-limiting embodiments may integrate and/or comprise one or more of these apparatus, systems, and/or methods.

In addition, certain embodiments of the invention provide for partial anonymity and partial disclosure by tying certain parameters to an alias that may or may not be disclosed and therefore may be inferred throughout a structured staged price discovery process.

Also, certain embodiments of the invention comprise an apparatus, system and method to solicit a purchase and/or sales agreement by defining, selecting, and communicating at least the product and/or service to purchase or sell, and the required response criteria. Such response criteria may include, but not be limited to time. Such embodiments may further comprise the ability to select a firm commitment from at least one responder who has evaluated at least the product or service definition, and who has affirmatively responded in the required manner within established contextual parameters. Such contextual parameters may include, but not be limited to counterparty name and other associated information, including information tied to historical behavior in conjunction with other purchase/sale parameters. In addition, such response may be required prior to or in conjunction with the offering of firm price parameters. Certain embodiments may also provide that the solicitor of an offering may reject any firm response for any reason and may select and communicate additional solicitations tied to the previous by product or service definition containing at least the product or service definition from any of the previous responders, having met the predefined response criteria.

Additionally, certain embodiments of the invention provide a transaction parameter discovery and/or negotiation apparatus, system and method that builds firm transaction parameters initiated through a one to many customized apparatus, system and method between possible transaction parties. Such an apparatus, system and method may offer the initiator of the transactional process discretion to disclose certain transaction parameters and filter other and disparate sets of parameters from potential transaction partners throughout a timed and multi-staged process.

Other embodiments of the apparatus, system and method of the invention may comprise a negotiation process with a group of unspecified potential transaction partners that finds the best transactions from within the group of potential transaction partners.

In certain embodiments, the apparatus, system and method of the instant invention may comprise a user interactive or other automated system, such as a computerized system, which utilizes the input or acquisition of data and other information from one or more sources. Such data and information may be input to the apparatus and/or system of this invention through one or more computerized input/output devices such as computer terminals, servers, laptop computers, smart tablets, smart phones, or other portable or non-portable electronic devices.

The data and other information may then be analyzed, transformed, or otherwise processed via one or more computerized processing devices, each of which may comprise both a computer processor and associated software which includes instructions for appropriate processing of such data and information.

The input and processed data and information may also be stored in accordance with the apparatus, system and method of this invention in one or more storage devices, such as computer memory devices, for archiving and later retrieval by the system of this invention for further processing and/or as output data and information generated by the computerized system. Output data and information may also be stored in one or more such storage devices for archiving and later retrieval, further processing, and/or as output data and information generated by the computerized apparatus and/or system of this invention.

Data and information input to, processed by, or output from the apparatus and/or system of this invention may be retrieved by users of the apparatus and system of this invention through one or more computerized input/output devices such as computer terminals, servers, laptop computers, smart tablets, smart phones, or other portable or non-portable electronic devices.

The apparatus, system and method of the instant invention may also be carried out via computerized apparatus and/or systems which may be accessed either through closed architecture computerized systems such as, for example, client and server computer networks, and/or through open architecture computerized systems such as, for example, web-based portals accessed via the Internet.

One embodiment of the instant invention comprises an apparatus, system and method for negotiating a sales transaction between two or more users of the apparatus, system and method, where the two or more users comprise at least a first user and a second user, and the sales transaction comprises a sales offering.

This embodiment of the apparatus, system and method may further comprise a central processing device, two or more user interface devices in operative communication with the central processing device. The central processing device may progressively disseminate information related to the sales offering from the first user, through at least one of the user interfaces, to the second user, as well as any other users designated by the first user. The central processing device may also progressively disseminate information related to the sales offering from at least the second user, through at least one of the user interfaces, to the first user.

This embodiment may also maintain the anonymity of the users of the apparatus, system and method of the invention, selectively and/or progressively disseminate all or a portion of information related to the sales offering and/or transaction to the parties on either side of the offering and/or transaction, and/or limit the time allotted for a user to respond (by acceptance, rejection, or counterproposal) to a sales proposal made by another user.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, in which like numerals refer to like parts, and wherein:

FIG. 2 through FIG. 28 are screenshots of an electronic, computerized user interface implemented in one embodiment of the present invention.

DETAILED DESCRIPTION OF THE INVENTION

Figure 1:
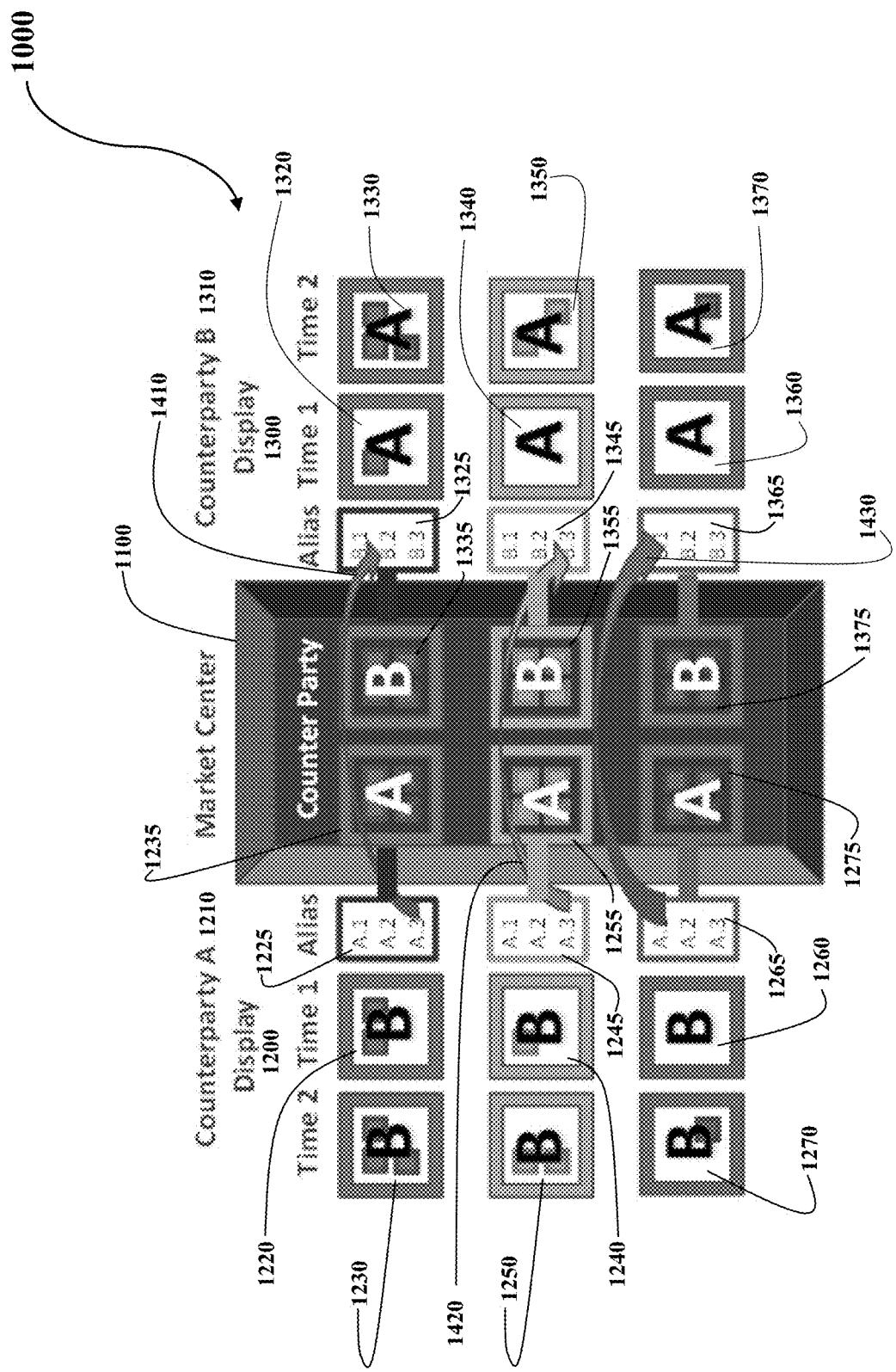
FIG. 1 is a block diagram illustrating an embodiment of the apparatus, system, method, architecture and dataflow of the present invention.

It is to be understood that the figures and descriptions of the present invention have been simplified to illustrate elements that are relevant for a clear understanding of the present invention, and that other features, elements, functionality and/or components may also be utilized in the various embodiments of the invention. In addition, those of ordinary skill in the pertinent art may recognize that other features, elements, functionality and/or components may be desirable and/or required in order to implement certain embodiments of the present invention. However, because in some instances certain features, elements, functionality and/ or components may be well known in the art, and/or may not facilitate a better understanding of the present invention, a discussion of such elements may not be expressly provided herein.

In one embodiment, the present invention comprises an apparatus, system and method and that produces a decentralized multilateral electronic execution facility that is regulated by a central facility through which anonymous participants may anonymously define and direct certain trading interests to other anonymous participants such that an orderly process may electronically disclose and display certain information to certain entities through user regulated aliases at various steps and/or incrementally throughout the negotiation and response process intended to culminate in the execution of a trade or other buying and selling activity. This embodiment of the invention allows counterparties to manage the level of information exposed to a closed community on a case by case basis, and/or to reduce or otherwise control information leakage and/or dissemination while discovering genuine transaction opportunities between the various parties.

In this embodiment of the invention, this objective is achieved through the use of one or more user aliases whose relevant information may be tied to a party's or a party's organization's legally regulated information, wherein such information may be disclosed in an iterative and/or systematic manner depending upon particular transactional circumstances such as, for example, the stage of the negotiation, the product being negotiated, and/or the intentions of the parties. In this embodiment, the aliases of one or more of the participants may be manually adjusted at any time by the participants and/or algorithmically managed by system preferences associated with each participant. Each alias may be linked to a user account, and a single set of firm level and/or other information made available on a firm level and/or on an alias level, depending upon the rules of the marketplace for the particular product and/or product segment being offered.

Such end user controlled but centrally managed functionality and capabilities results in an orderly, controlled and sequential process to disseminate enough information to anonymously discover genuine interest levels in consummating a transaction by directing interest from one or more participants acting under respective aliases to one or more other participants acting under their respective aliases (e.g. available by firm categories, alias identification and history, etc.), and offer the interested parties the opportunity to protect relevant information as closely or disseminated as widely as desired and/or the situation requires. Thus, in this embodiment of the invention participants may each approach the market based upon their competitive advantage by maintaining a "brand" alias, or by randomizing its alias or resetting its alias after each trade, or all of the above. In this embodiment of the invention enables users to customize the apparatus, system and method as each situation may require, and to implement each user's own unique approach, including but not limited to the management of multiple aliases as a central tenant of interaction within the marketplace.

Thus, in certain embodiments of the invention multiple aliases may be manipulated wherein such aliases may have certain characteristics that may be tied to a single centrally managed and verified source of linked firm-level and transaction information, and that may be progressively displayed to participants in iterative stages during the negotiation process. There also may be numerous negotiation processes that have well defined disclosure rules across a number of product categories. One or a number of negotiation processes may be used as determined by the marketplace. The market may, for example, allow each alias to request a different negotiation process for the same intended trading objective.

Reference will now be made in detail to several exemplary and non-limiting embodiments of the present invention, some of which are illustrated in the accompanying drawings.

Referring now to FIG. 1, there is shown a block diagram illustrating an embodiment of the Anonymous Price and Progressive Display Execution apparatus, system, method, architecture and dataflow 1000 of the present invention. FIG. 1 illustrates a two counterparty scenario describing the multiple alias relationships between the two parties. While two parties are illustrated (namely, Counterparty A 1210, and Counterparty B 1310, respectively) in order to detail the multiple alias and information relationships that may result in an execution based upon the combination of information disclosed between two parties, other embodiments of the present invention may comprise an apparatus, systems and/ or methods that manage the relationships of any number of parties, and/or multiple aliases, and/or combinations of information across more than two (e.g. up to "n" number) of parties. As such, FIG. 1 simplifies the apparatus, system and method of the present invention in a non-limiting manner.

In the embodiment illustrated in FIG. 1, System 1000 may comprise Central Processing Facility (also referred to as "Market Center") 1100, Counterparty A Interface (also referred to as "Counterparty A Display") 1200, and Counterparty B Interface (also referred to as "Counterparty B Display") 1300. In certain embodiments, Central Processing Facility 1100 may comprise a computer processor which processes data and other information received through Counterparty A Interface 1200 and/or Counterparty B Interface 1300, and/or disseminates processed and/or non-processed data and information to Counterparty A Interface 1200 and Counterparty B Interface 1300.

Central Processing Facility 1100 may receive data and/or other information which may then be analyzed, transformed, or otherwise processed via one or more computerized processing devices, each of which may comprise one or more a computer processors and/or associated software which software may include instructions for appropriate processing of such data and/or information.

Central Processing Facility 1100 may also comprise one or more storage devices, such as computer memory devices, for archiving and later retrieval by System 1000 for further processing and/or as output data and information generated by computerized System 1000. Output data and information may also be stored in one or more such storage devices for archiving and later retrieval, further processing, and/or as output data and information generated by System 1000.

Counterparty Interfaces 1200 and 1300 may comprise one or more computerized input/output devices such as computer terminals, servers, laptop computers, smart tablets, smart phones, or other portable or non-portable electronic devices. Counterparty Interfaces 1200 and 1300 may also provide access to Central Processing Facility 1100 via closed architecture computerized systems such as, for example, client and server computer networks, and/or through open architecture computerized systems such as, for example, web-based portals accessed via the Internet.

Counterparty A 1210 (also referred to herein as Party A 1210), and Counterparty B 1310 (also referred to herein as Party B 1310) are represented in FIG. 1 opposite each other and separated by, and through Counterparty A Interface 1200 and Counterparty B Interface 1300, respectively, interface with Central Processing Facility 1100, wherein all information related to a negotiation and/or transaction managed by Central Processing Facility 1100 may be processed, stored and disseminated. Such information may include, but may not be limited to, all information related to the negotiation and consummation of a contemplated transaction between all parties, information associated with or otherwise related to Party A 1210, Party B 1310, and any other parties involved in the negotiation and/or transactional process, identification of respective parties' organizational and/or firm affiliations, alias identification and history, firm categories, respective party's as well as market dictated product, transactional, negotiation and trading rules, requirements, limitations and restrictions, and historical data related to previous negotiations and transactions.

In certain embodiments, System 1000 may comprise any number of Counterparty Interfaces (e.g. "Counterparty C Interface," "Counterparty D Interface," etc.) depending upon the number of parties involved in a particular transaction. System 1000 may also comprise more than one Central Processing Center 1100 depending upon the configuration and architecture necessary or desired as a result of the functionality desired or required by System 1000.

FIG. 1 further depicts three non-limiting scenarios which exemplify the manner in which alias, negotiation, and other related transactional information may be disseminated to Party A and Party B in a controlled, iterative and sequential manner. Each scenario is depicted by a color code Blue Scenario 1410, Orange Scenario 1420, and Red Scenario 1430.

For each scenario, FIG. 1 depicts a selected alias (e.g. Aliases 1225, 1245, 1265, 1325, 1345, 1365) initiating contact through its linked entity or organization (e.g. Organizations 1235, 1255, 1275, 1335, 1355, and 1375 respectively) at Central Processing Center 1100 to another entity or organization (e.g. Organization 1235 linked to Organization 1335, Organization 1255 linked to Organization 1355, and Organization 1275 linked to Organization 1375), which is, in turn, linked to another outside alias (e.g. Organizations 1235, 1255, 1275, 1335, 1355, and 1375 respectively) at Central Processing Center 1100.

For example, in Blue Scenario 1410, Party A 1210 first discloses to Party B 1310, through Central Processing Center 1100, a subset or portion of select Party A 1210 alias, order, party, performance and/or other information to be displayed to Party B 1310 through Counterparty B Display 1300, as depicted in Box 1320 labeled A at Time 1.

In response to the dissemination of information by Party A 1210, the selected alias of Party B 1310 discloses to Party A 1210 on behalf of Party B 1310 through Central Processing Center 1100 a subset or portion of select Party B 1310 alias, order, party, performance and/or other information to be displayed to Party A 1210 through Counterparty A Display 1200, as depicted in Box 1220 labeled B at Time 1.

Party A 1210 may then disclose another subset of information through Central Processing Center 1100 which information may become available to Party B 1310 in Counterparty B Display 1300, as depicted in Box 1330 labeled A at Time 2. In response, Party B may then disclose another subset of information through Central Processing Center 1100 which information may become available to Party A 1210 in Counterparty A Display 1200, as depicted in Box 1230 labeled B at Time 2.

This progressive process of iterative and/or sequential dissemination of information between the parties may continue until either all information is disclosed and/or exchanged, the parties complete or otherwise terminate their negotiations, a transaction is consummated, or other conclusive event occurs or situation is reached.

In a second scenario, Orange Scenario 1420, FIG. 1 illustrates a similar process of information exchange between the same parties but having different aliases linked to the same entity or organization where different subsets of information may be exchanged between Parties A 1210 and B 1310.

In Orange Scenario 1420, Party A 1210, optionally using a different alias from that used in Blue Scenario 1410, first discloses to Party B 1310, through Central Processing Center 1100, a subset or portion of select Party A 1210 alias, order, party, performance and/or other information to be displayed to Party B 1310 through Counterparty B Display 1300, as depicted in Box 1340 labeled A at Time 1.

In response to the dissemination of information by Party A 1210, the selected alias of Party B 1310, which may be different from the alias used by Party B 1310 in Blue Scenario 1410, may disclose to Party A 1210 on behalf of Party B 1310 through Central Processing Center 1100, a subset or portion of select Party B 1310 alias, order, party, performance and/or other information to be displayed to Party a 1210 by Counterparty A Display 1200, as depicted in Box 1240 labeled B at Time 1.

Party A 1210 may then disclose another subset of information through Central Processing Center 1100 which information may become available to Party B 1310 in Counterparty B Display 1300, as depicted in Box 1350 labeled A at Time 2. In response, Party B may then disclose another subset of information through Central Processing Center 1100, which information may become available to Party A 1210 in Counterparty A Display 1200, as depicted in Box 1250 labeled B at Time 2.

This progressive process of iterative and/or sequential dissemination of information between the parties may continue until either all information is disclosed and/or exchanged, the parties complete or otherwise terminate their negotiations, a transaction is consummated, or other conclusive event occurs or situation is reached.

In a third scenario, Red Scenario 1430, FIG. 1 illustrates a similar process of information exchange between the same parties but having different aliases linked to the same entity or organization where of different subsets of information may be exchanged between Parties A 1210 and B 1310.

In Red Scenario 1430, the same parties are involved but use yet a third alias linked to the same entity or organization, and provide yet another vehicle for exchanging different subsets of information between the parties. In Red Scenario 1430, Party A 1210, optionally using a different alias from that used in prior Scenarios, first discloses to Party B 1310, through Central Processing Center 1100, a subset or portion of select Party A 1210 alias, order, party, performance and/or other information to be displayed to Party B 1310 through Counterparty B Display 1300, as depicted in Box 1360 labeled A at Time 1.

In response to the dissemination of information by Party A 1210, the selected alias of Party B 1310, which may be different from the alias used by Party B 1310 in prior Scenarios, may disclose to Party A 1210 on behalf of Party B 1310 through Central Processing Center 1100, a subset or portion of select Party B 1310 alias, order, party, performance and/or other information to be displayed to Party a 1210 by Counterparty A Display 1200, as depicted in Box 1260 labeled B at Time 1.

Party A 1210 may then disclose another subset of information through Central Processing Center 1100 which information may become available to Party B 1310 in Counterparty B Display 1300, as depicted in Box 1370 labeled A at Time 2. In response, Party B may then disclose another subset of information through Central Processing Center 1100, which information may become available to Party A 1210 in Counterparty A Display 1200, as depicted in Box 1270 labeled B at Time 2.

This progressive process of iterative and/or sequential dissemination of information between the parties may continue until either all information is disclosed and/or exchanged, the parties complete or otherwise terminate their negotiations, a transaction is consummated, or other conclusive event occurs or situation is reached.

Generally, any number of aliases may initiate a process similar to the process of information exchange depicted in FIG. 1. While FIG. 1 depicts two time series (i.e. Time 1 and Time 2), any number of time series may be controlled either by the alias/entity, and/or Central Processing Center 1100. The information may also be updated, disclosed, and/or displayed by either the alias or entity of Central Processing Center 1100.

Although FIG. 1 depicts information flow from Counterparty A 1210 Aliases 1225, 1255 and 1265, to Counterparty B 1310 Aliases 1325, 1355 and 1365 respectively, as the foregoing Scenarios exemplify, System 1000 of the present invention may permit information and other data to flow in either direction at the same or different times between any desired Counterparties (e.g. information flow from Counterparty B 1310 Aliases 1325, 1355 and 1365 to Counterparty A 1210 Aliases 1225, 1255 and 1265 respectively).

Turning now to FIG. 2 through FIG. 28, there is shown yet another embodiment of the apparatus, system and method of the instant invention. More specifically, FIG. 2 through FIG. 28 depict screenshots of an electronic, computerized User Interface which may act as an input/output interface to allow users to interact with the apparatus, system and method of the instant invention.

For example, the User Interface of FIG. 2 through FIG. 28 may be implemented as the input/output device for System 1000 depicted in FIG. 1. Additionally or alternatively, the User Interface of FIG. 2 through FIG. 28 may be adapted for use with System 1000 of FIG. 1 as Counterparty A Display 1200 and/or Counterparty B Display 1300.

The User Interface of FIG. 2 through FIG. 28 may comprise an input device for inputting various information and data associated with Counterparty A 1210, Counterparty B 1310, their respective aliases and associated entities/organizations, and/or information related to contemplated transactions.

The User Interface of FIG. 2 through FIG. 28 may also comprise Counterparty A Display 1200 and Counterparty B Display 1300 for displaying data and information output from System 1000.

The User Interface of FIG. 2 through FIG. 28 may also provide access to the functionality of Central Processing Center 1100.

Figure 2:
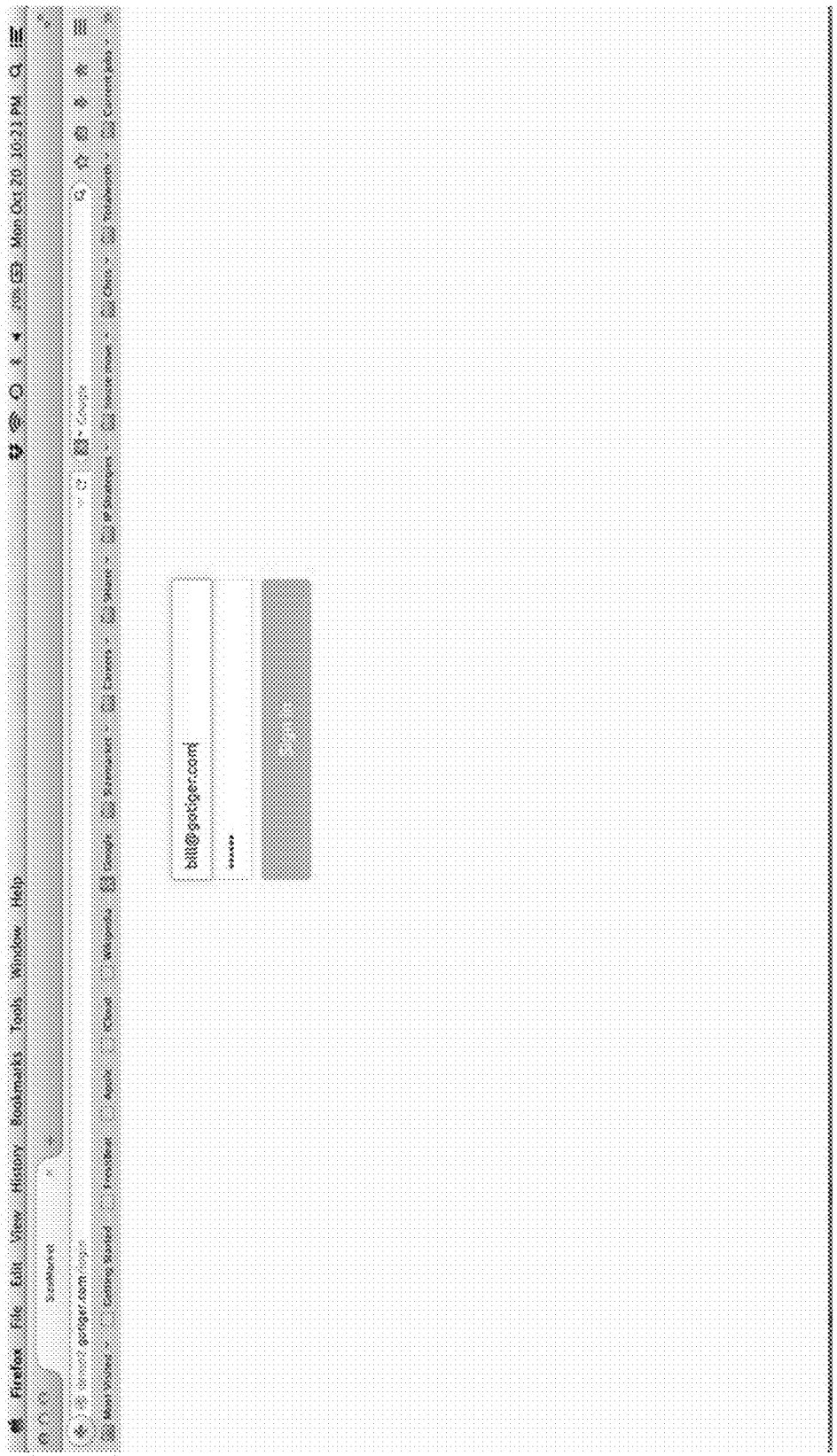

Turning now to the screenshots of the User Interface depicted in FIG. 2 through FIG. 28, there is shown in FIG. 2 a user login screen in which users of the apparatus, system and method of the instant invention may securely login into a remote server on which Central Processing Center 1100 may reside.

Login credentials may be maintained at the server level. Each User may have a series of information associated with such User tied to a user ID. Such information may include, for example, User preferences, User names, firm name, trading credentials, access rights, credit limits, historical activity, third party relationships, firm name, firm type, and other data and information which may be used in connection with System 1000.

Figure 3:
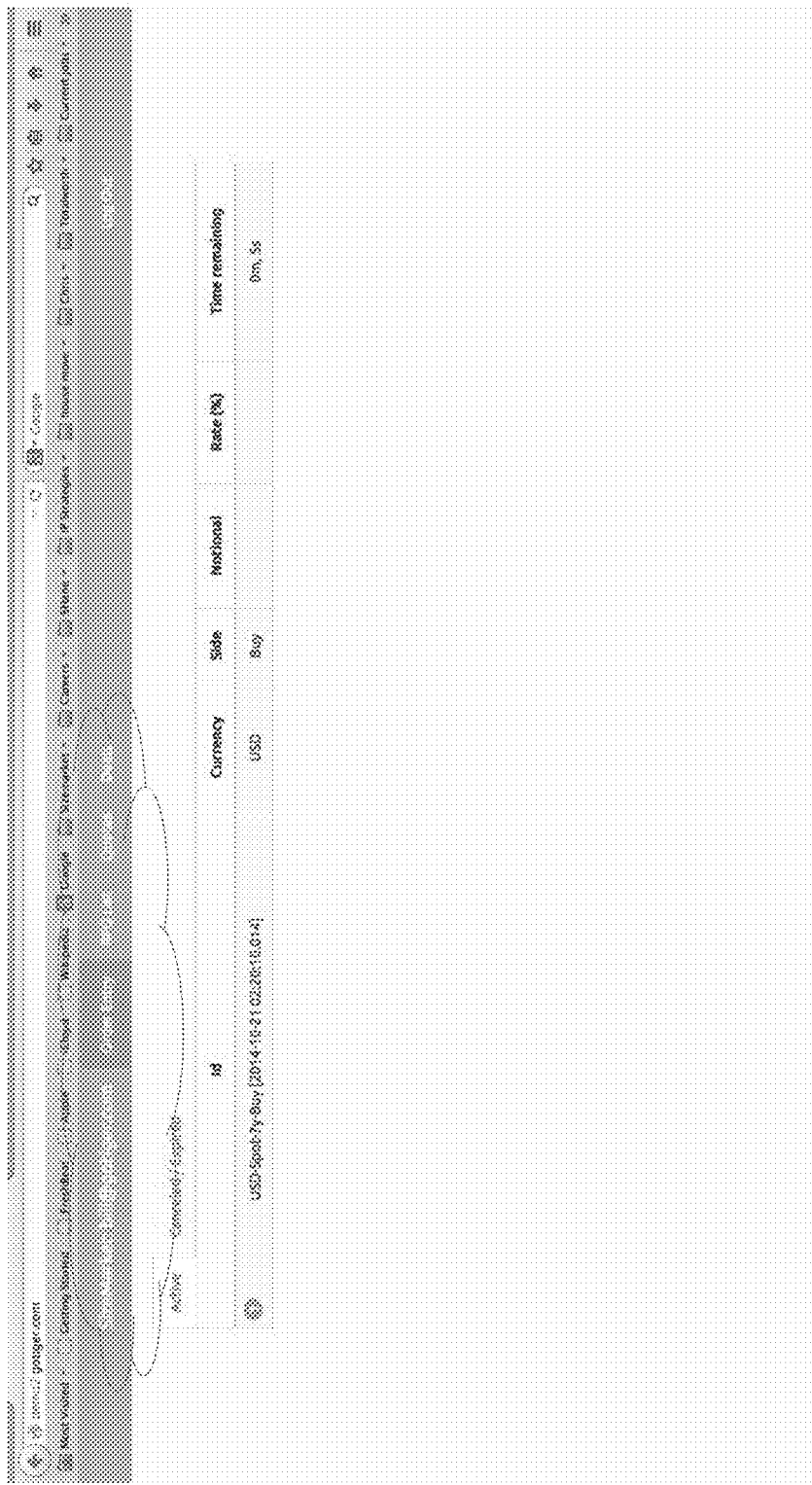

As shown in FIG. 3, once a User is logged into the System, the User Interface may present the User with a Main Menu. The Main Menu will allow the User to enter an order ("Order Entry"), to view its own orders ("RFQ List"), to review order/price information FIG. 4.

Figure 4:
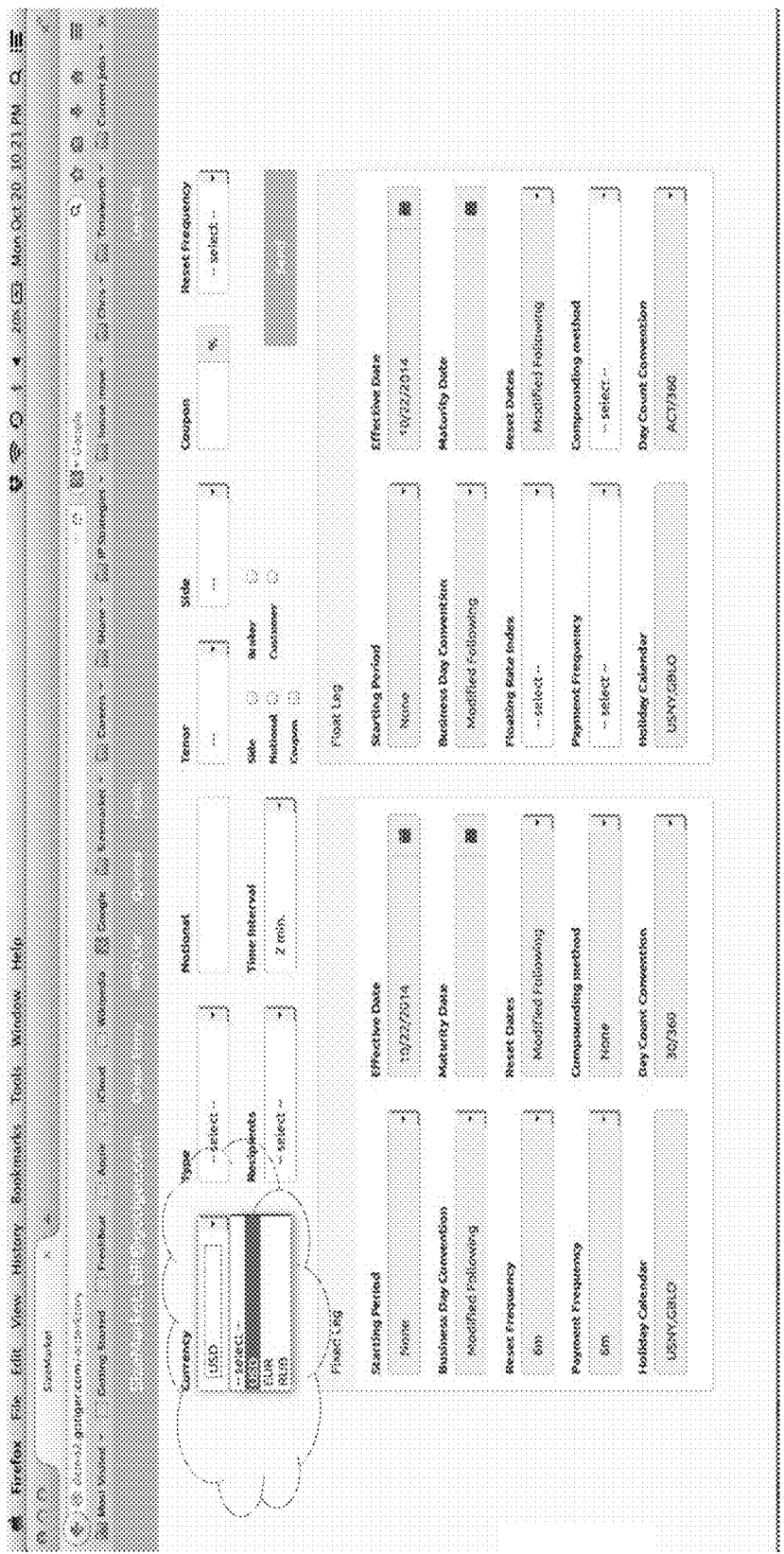
Figure 5:
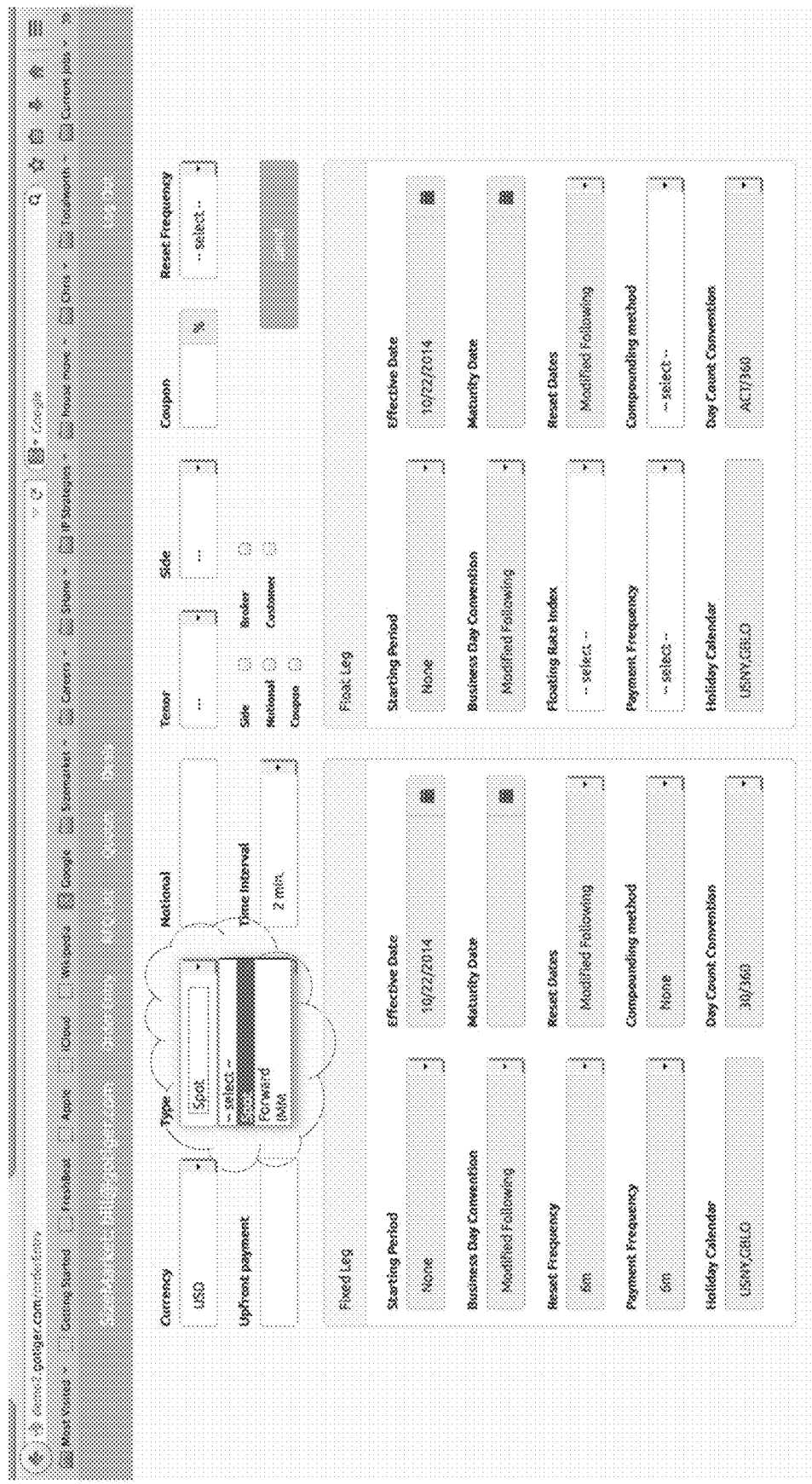

Clicking on "Order Entry" brings the user to the Order Entry Screen depicted in FIG. 4.

Within the Order Entry Screen of the FIG. 4, a User (sometimes referred to herein as an "Order Initiator") may define and/or select the product to be traded, and define the parameters and/or manner in which the apparatus, system and method of the invention may interact with the market, and/or the parameters and/or manner in which buying, selling, trading and or other basis for a transaction may be conducted. Such parameters and/or manner of conduct may include but not limited to, specific order parameters, participants who may be involved, the required timing of responses, and the initial disclosures of information to the market.

In the embodiment shown in FIG. 4, the User first selects in the Order Entry Screen (as highlighted in FIG. 4) the currency ("Currency") that the product being offered will be denominated. It should be noted, however, that all of the functionality contemplated by the User Interface including, but not limited to each of interactions with the User Interface described herein, may also be achieved with a programmatic interaction through an API (application programming interface).

In this embodiment, the product being offered has a number of categories of products defined by the start date of the transaction. As highlighted in FIG. 5, the "Type" drop down button of the Order Entry Screen allows the User to select the start date convention from one of "Spot," "Forward," or "IMM." In the embodiment depicted in FIG. 5, the Type is selected to be "Spot."

Figure 6:
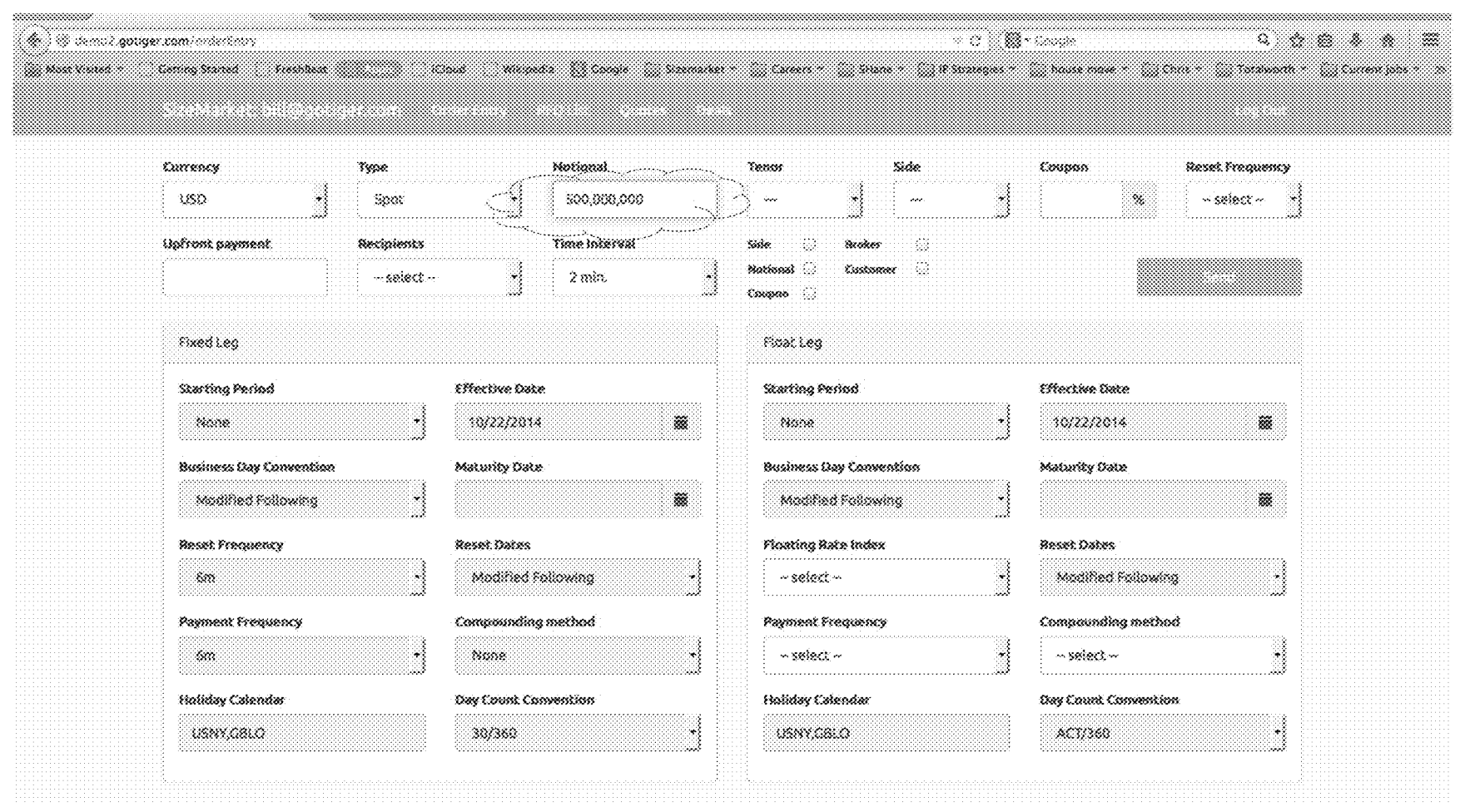

FIG. 6 highlights the "Notional" field of the Order Entry Screen in which the product being offered may be traded in any amount which is defined in the "Notional" field. In the embodiment depicted in FIG. 6, the Notional amount is selected to be $500 million.

Figure 7:
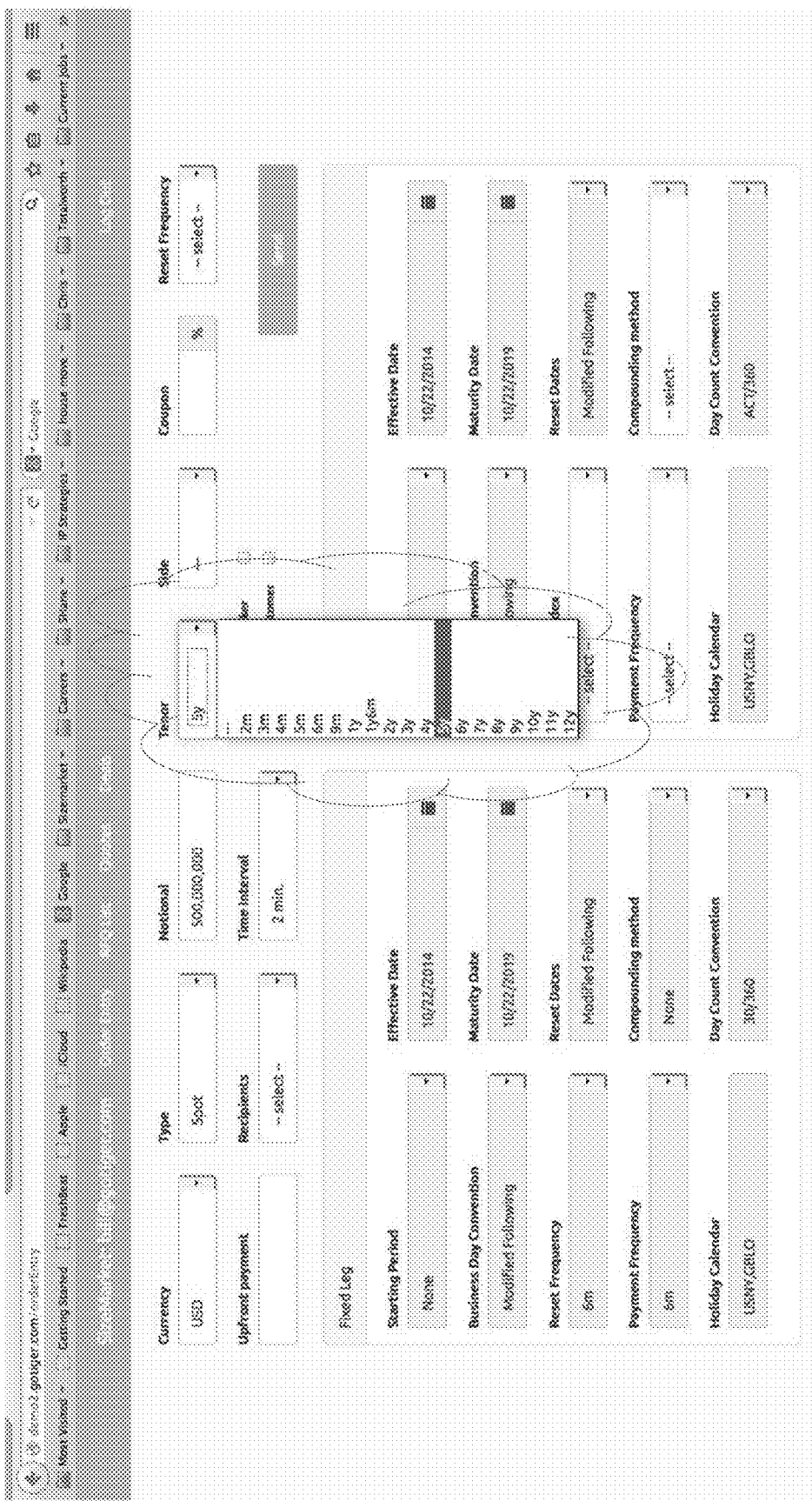

FIG. 7 highlights the "Tenor" field of the Order Entry Screen in which the user may define the length of time that this product will be effective. In this embodiment, the Tenor of the product is set at 5 years.

Figure 8:
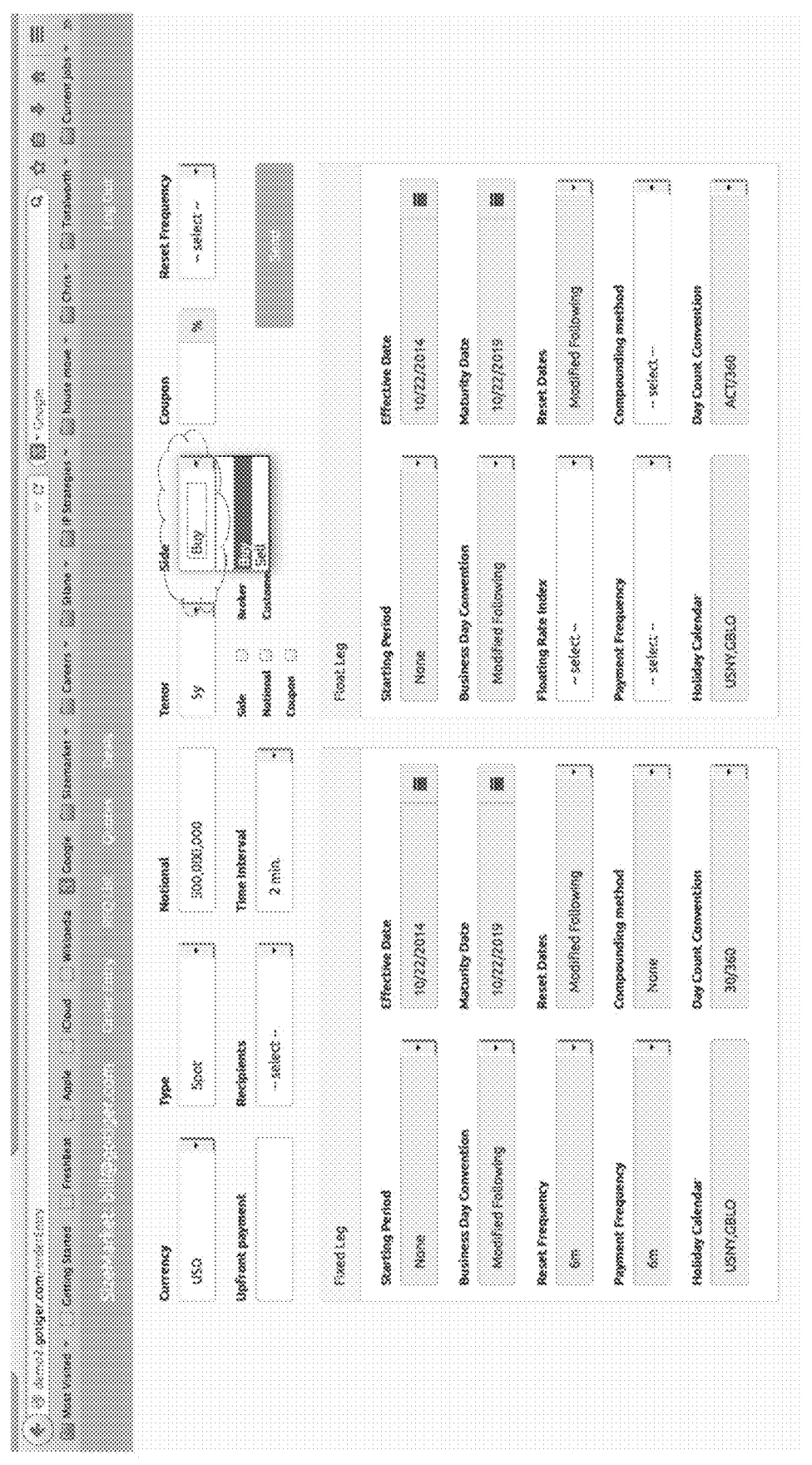

FIG. 8 highlights the "Side" field of the Order Entry Screen in which the User may define the side of the transaction on which the User will take. The User may select whether the User is a buyer or seller of the product, and, in this embodiment, has selected the "Buy" side of the transaction.

Figure 9:
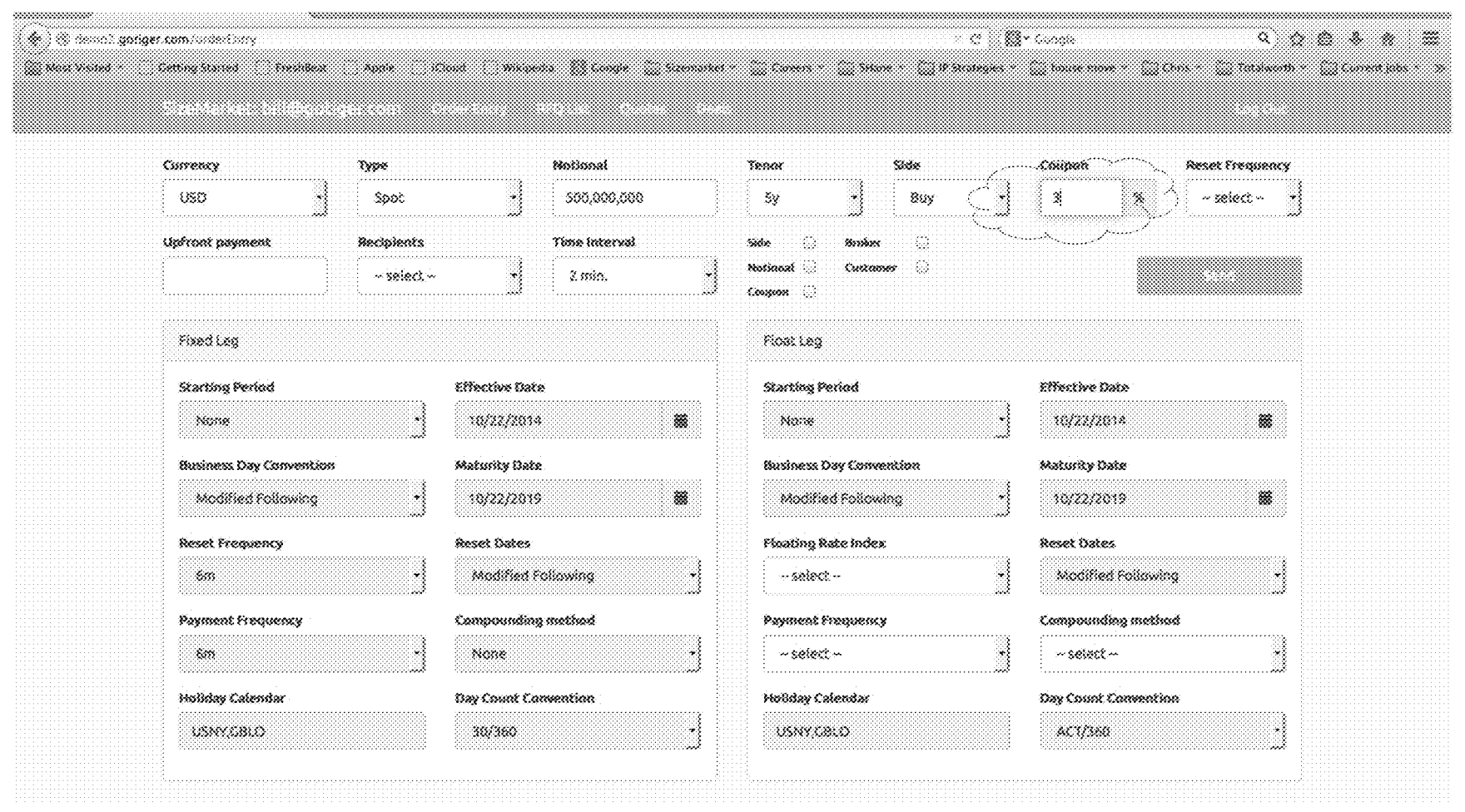

FIG. 9 highlights the "Coupon" field of the Order Entry Screen in which the User may define an interest or "Coupon." In this embodiment, the product uses an interest rate ("Coupon") to denominate its price, and the user may define a free form price within the "Coupon" field.

Figure 10:
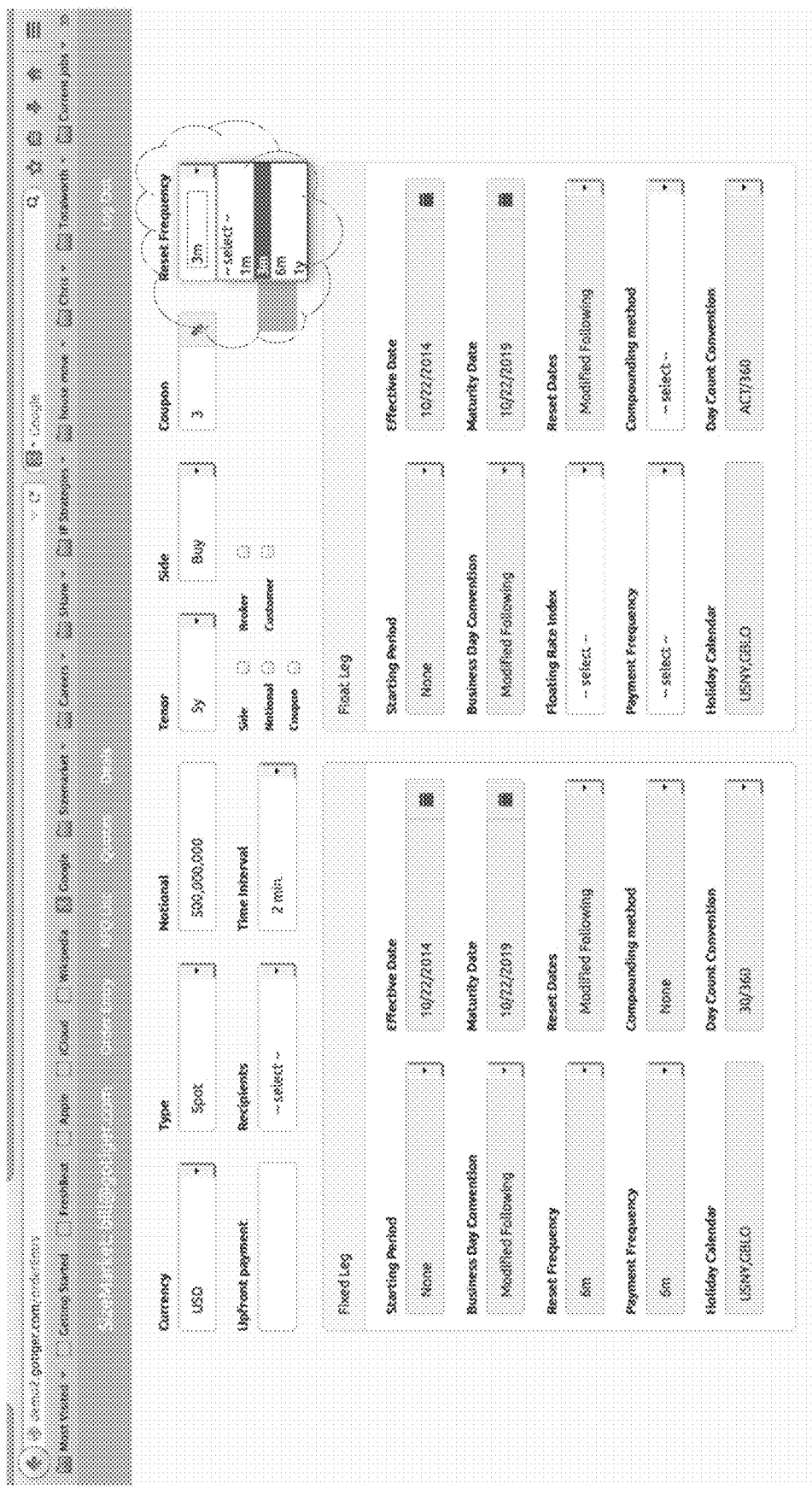

FIG. 10 highlights the "Reset Frequency" field of the Order Entry Screen in which the User may also describe a number of timed events that the product may use to calculate certain obligations. The User may be able to select a "Reset Frequency" to describe the time frame that the rate obligations calculations are to be executed. In the embodiment depicted in FIG. 10, the Reset Frequency is selected by the User to be 3 months.

Figure 11:
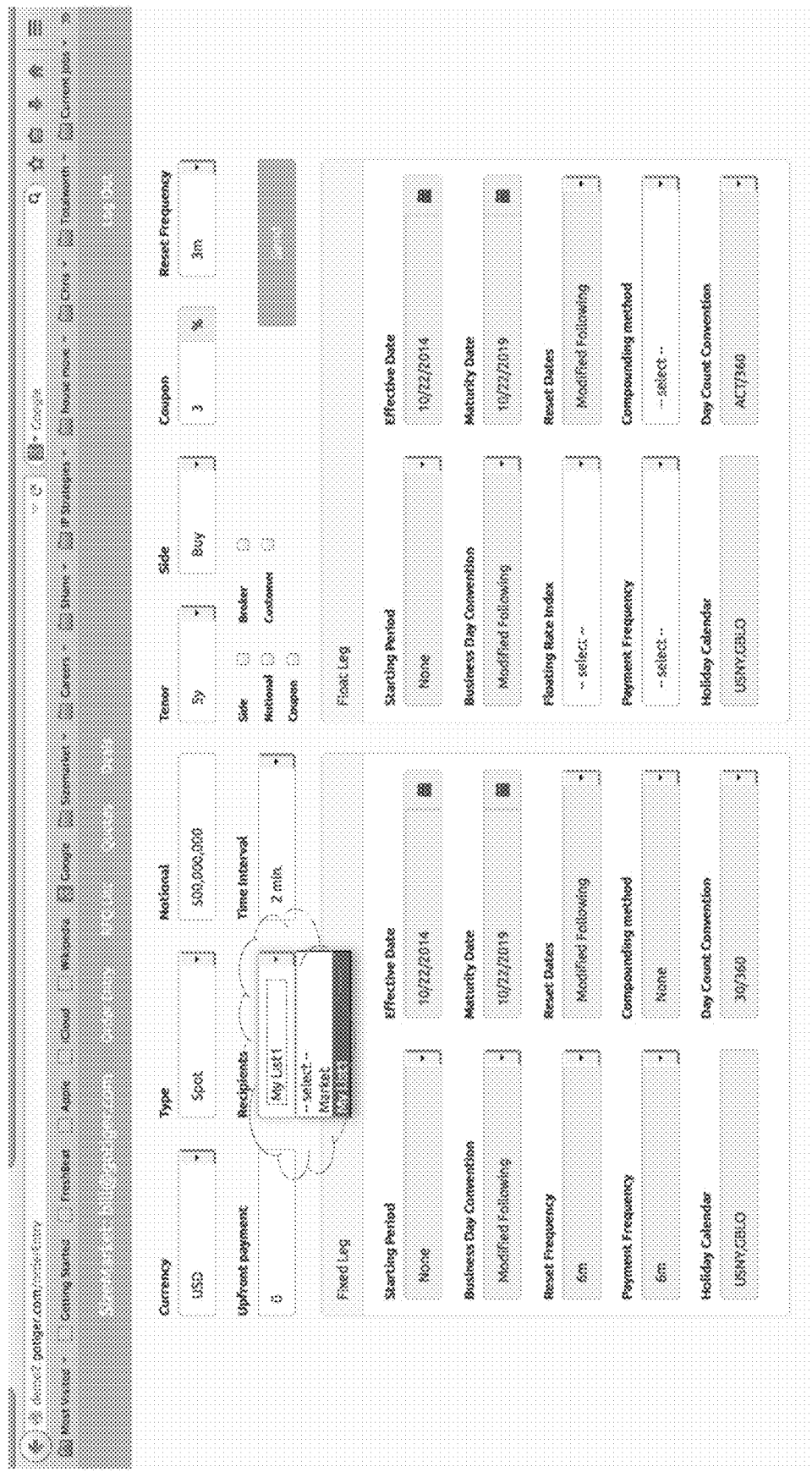

FIG. 11 highlights the "Recipients" field of the Order Entry Screen in which the User (in this case the "Order Initiator") may determine which participants (in this case "Order Responders") will receive a message describing the at least some of the information regarding the order on the product that the Order Initiator is interested in executing. In the embodiment depicted in FIG. 11, the Recipients selected by the User include those recipients who are classified under a grouping entitled "My List1."

Figure 12:
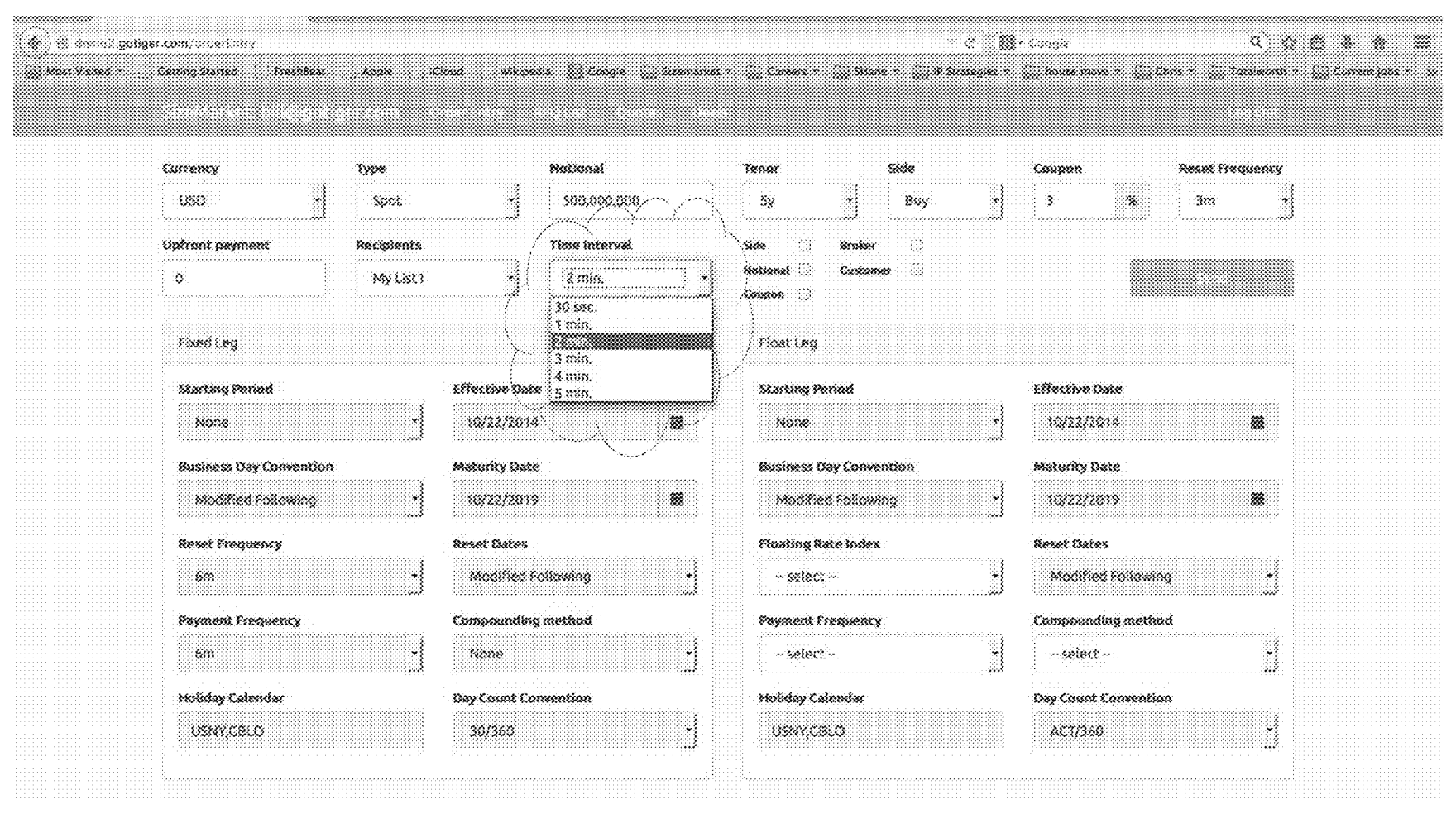

FIG. 12 highlights the "Time Interval" field of the Order Entry Screen in which the User has the ability to control and define the timed stages of the interactions between the Order Initiator and the Responders. The "Time Interval" drop down button allows the User to select from a number of timed intervals. In the embodiment depicted in FIG. 12, the Time Interval is selected by the User to be two (2) minutes between the time a party (the "Sending Party") disseminates to the other participating parties (the "Receiving Parties") information regarding the proposed transaction, and the time in which any Receiving Parties may respond to the Sending Party with information or other appropriate response.

It should be noted, however, that all time intervals related to the functionality of the apparatus, system and method of the invention, including the period of time being measured, as well as the points at which the time interval begins and ends, may be defined in any manner which suits the desired functionality of any particular embodiment of the invention.

Figure 13:
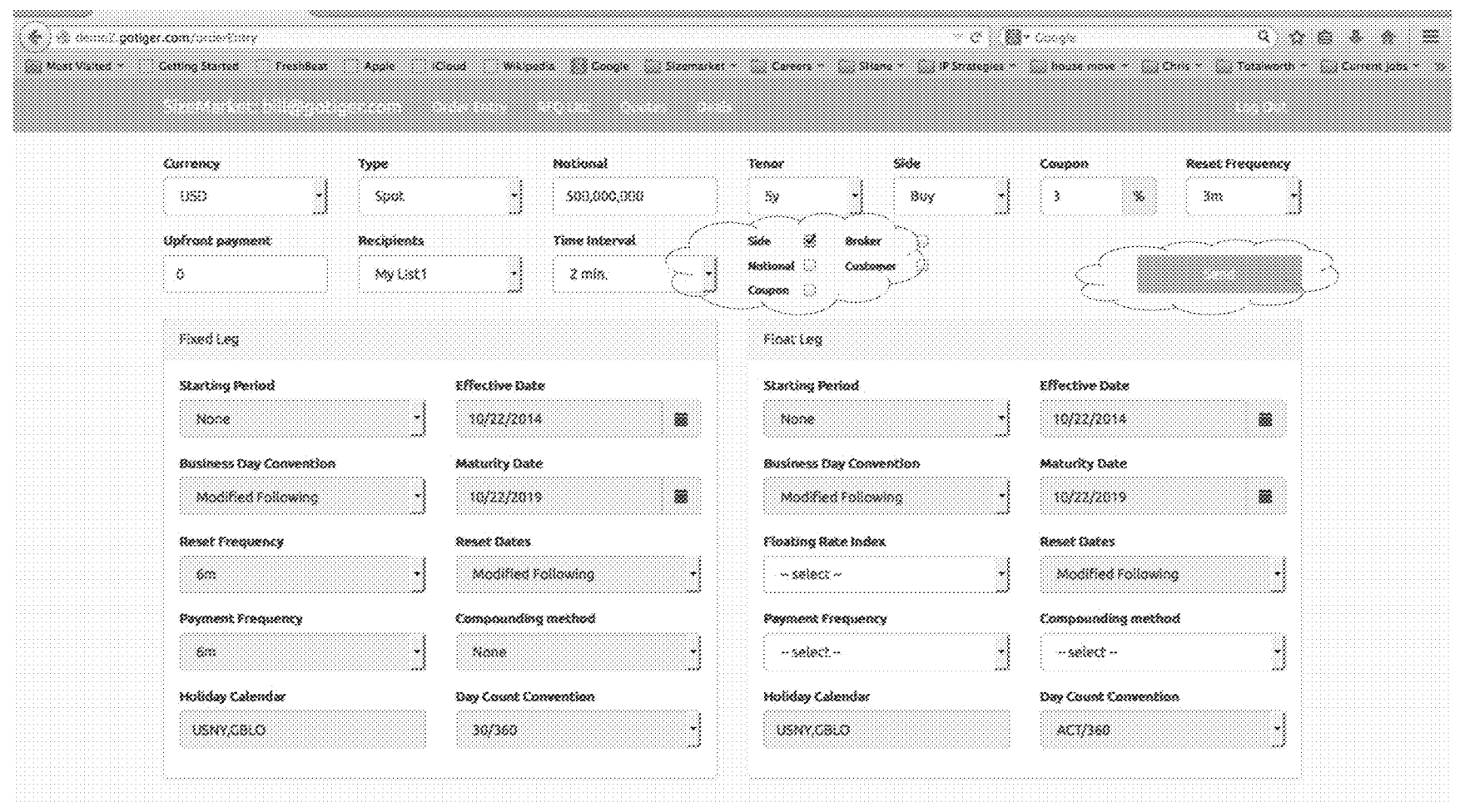

In the present embodiment, the User may control and define what information may be disclosed to recipients at each stage of the transaction process. FIG. 13 highlights the initial disclosures which will be made to such Recipients. In the embodiment depicted in FIG. 13, the Initial Disclosure may be selected by checking a check box for each disclosure. The information that the Order Initiator may disclose may include the "Side", "Notional" (e.g. Size), "Coupon" (e.g. Price), a participating party's legal entity name, or any other parameter desired for the particular transaction. In addition, the Initial Disclosure, or in certain embodiments of the invention, any disclosure, may be established before the Order Initiator sends the order and begins the First Stage of the negotiating and/or transactional process.

Once the User completes the process of inputting data and other information related to a proposed transaction into the Order Entry Screen, the User may then submit the Order to the System of the invention by clicking on the "Send" icon on the Order Entry Screen which, for the present embodiment, is highlighted in FIG. 13.

Figure 14:
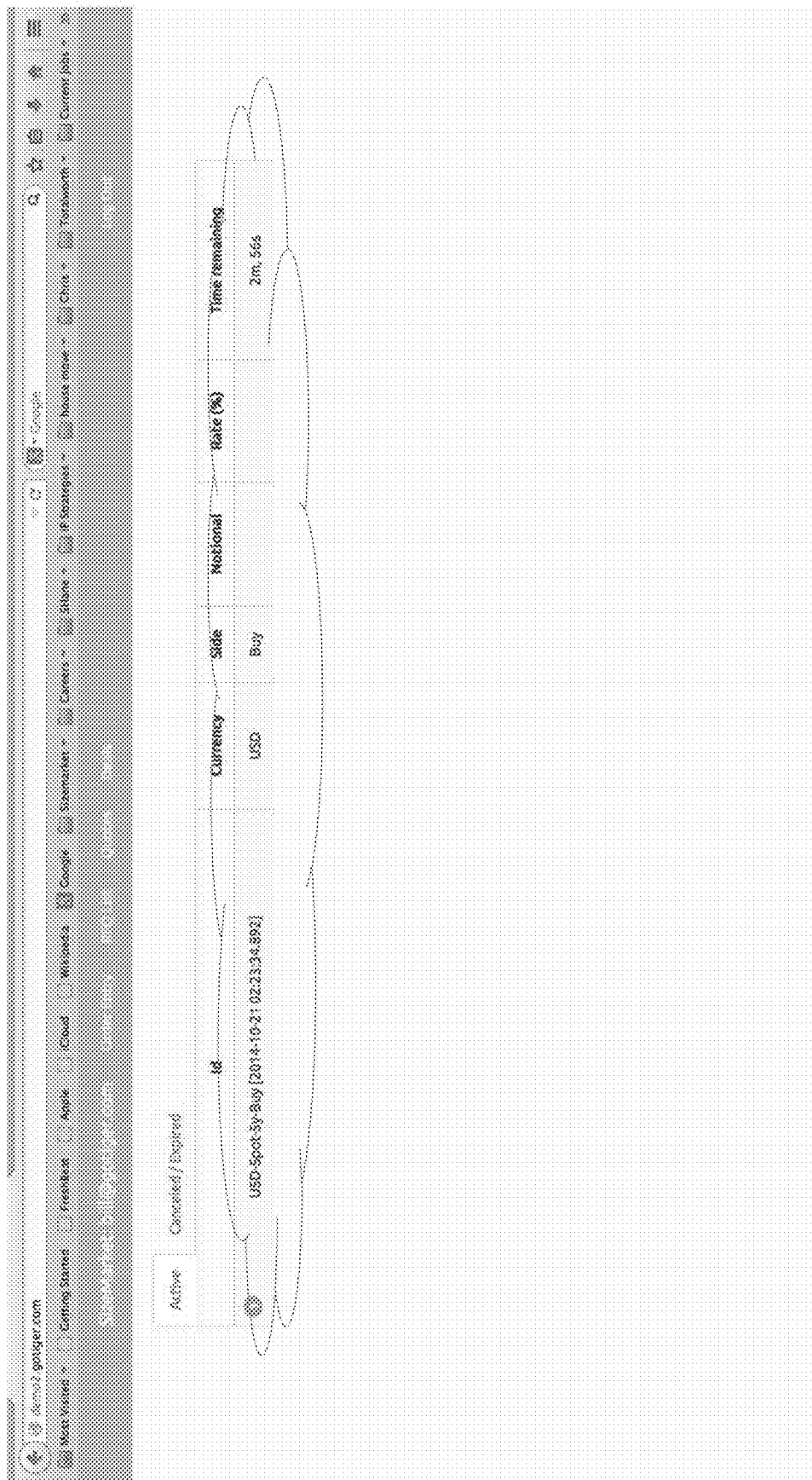

Once the User submits the Order through the Order Entry Screen, a summary of the Order may be displayed to the Order Initiator on an "Order Summary Screen" under a tab marked "Active." FIG. 14 depicts the Order Summary of the present embodiment which appears under the Active Tab of the Order Summary Screen after the submission of the Order through the Order Entry Screen.

Figure 15:
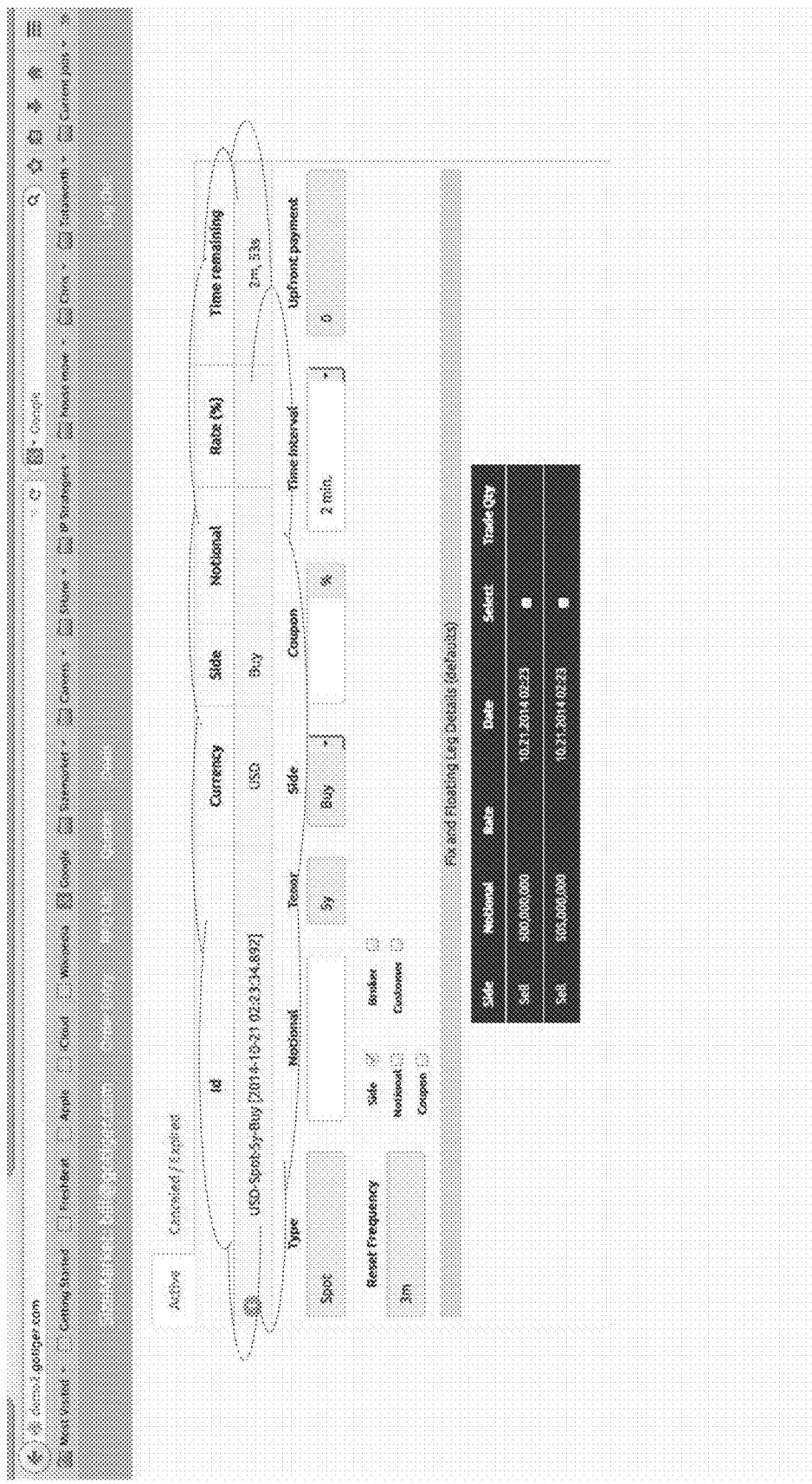

In the embodiment of the Order Summary Screen depicted in FIG. 15, the user may double click on any outstanding Order Summary under the Active Tab to: (i) view the disclosed details of the order which were chosen to be disclosed by the Order Initiator during the First Stage of the transactional process; (ii) provide the opportunity to Responding Parties to define the disclosure and other parameters of the Second Stage of the transactional process; (iii) view responses from selected Respondents; and (iv) view outstanding response times associated with the given Stage.

Figure 16:

In addition, as depicted in FIG. 16, a User may prepare disclosure information and select the participants for the next stage in the transactional process, as the user views responses from the selected participants and other information depicted on the Order Summary Screen.

Figure 17:
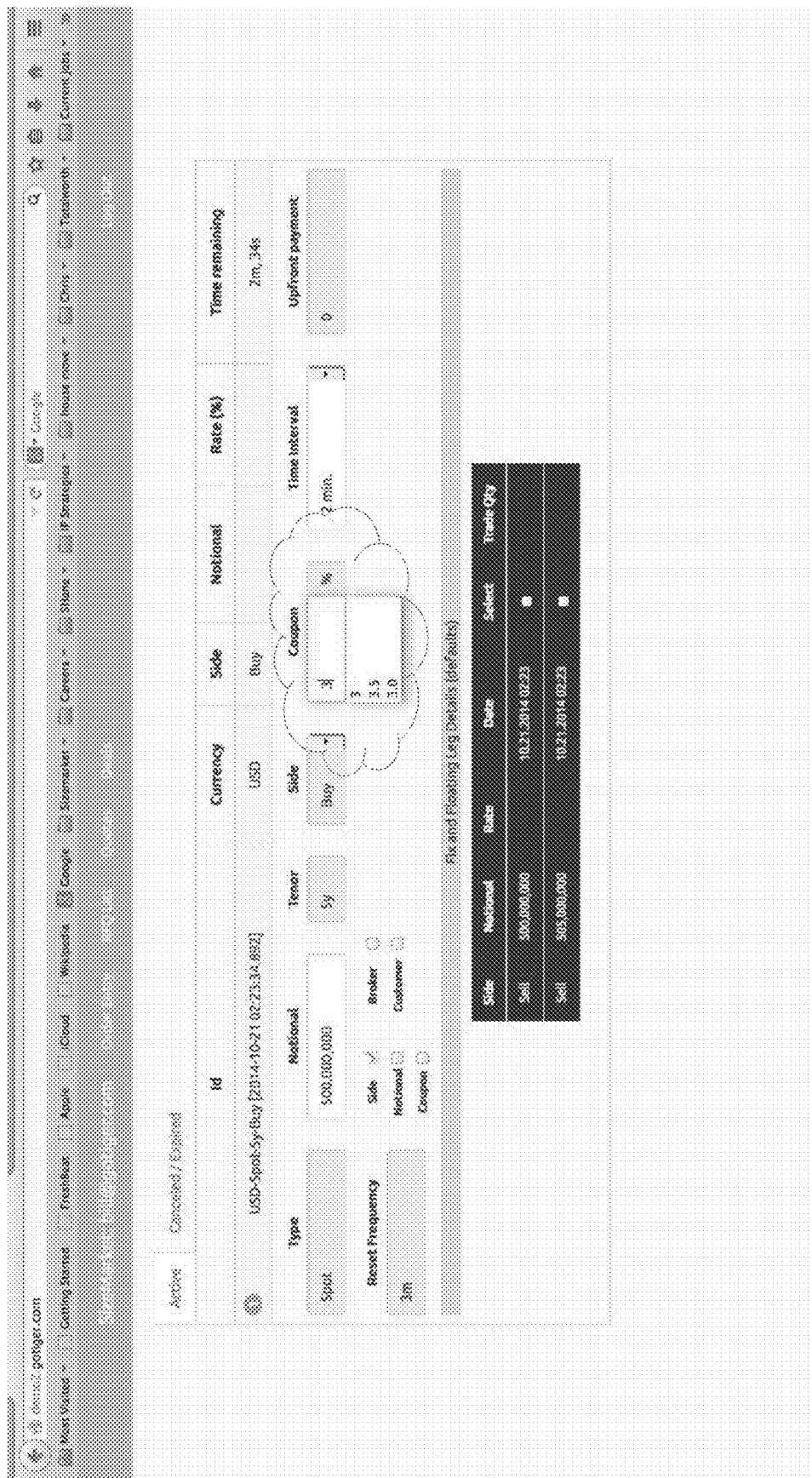

As depicted in FIG. 17, a User may define additional trading parameters that may or may not be disclosed during the Second or subsequent Stage in the transactional process through the Order Summary Screen.

Figure 18:
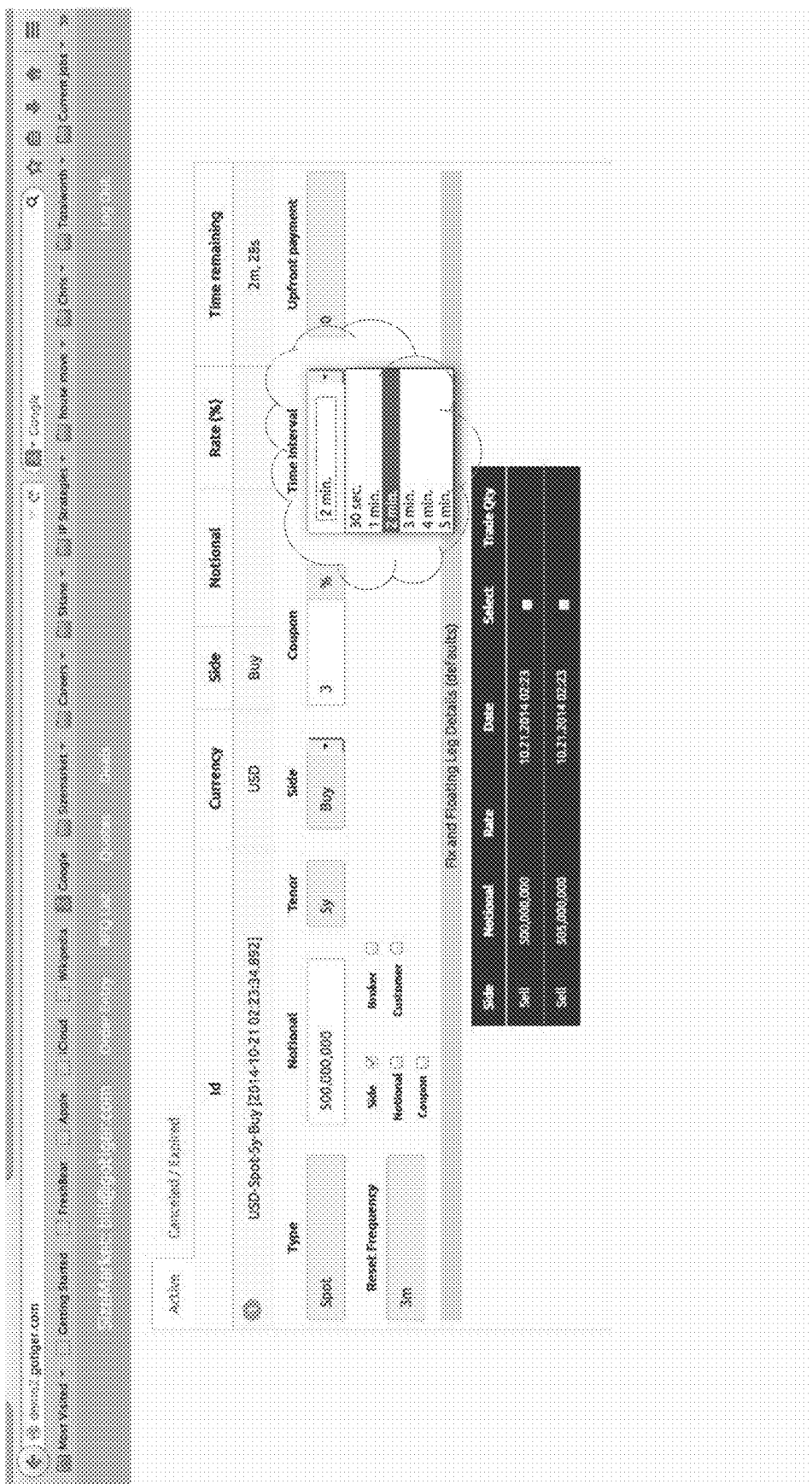

As depicted in FIG. 18, the User may control and/or define the required Response Time for the Second or subsequent Stage of the transactional process under the Time Interval section of the Order Summary Screen.

Figure 19:
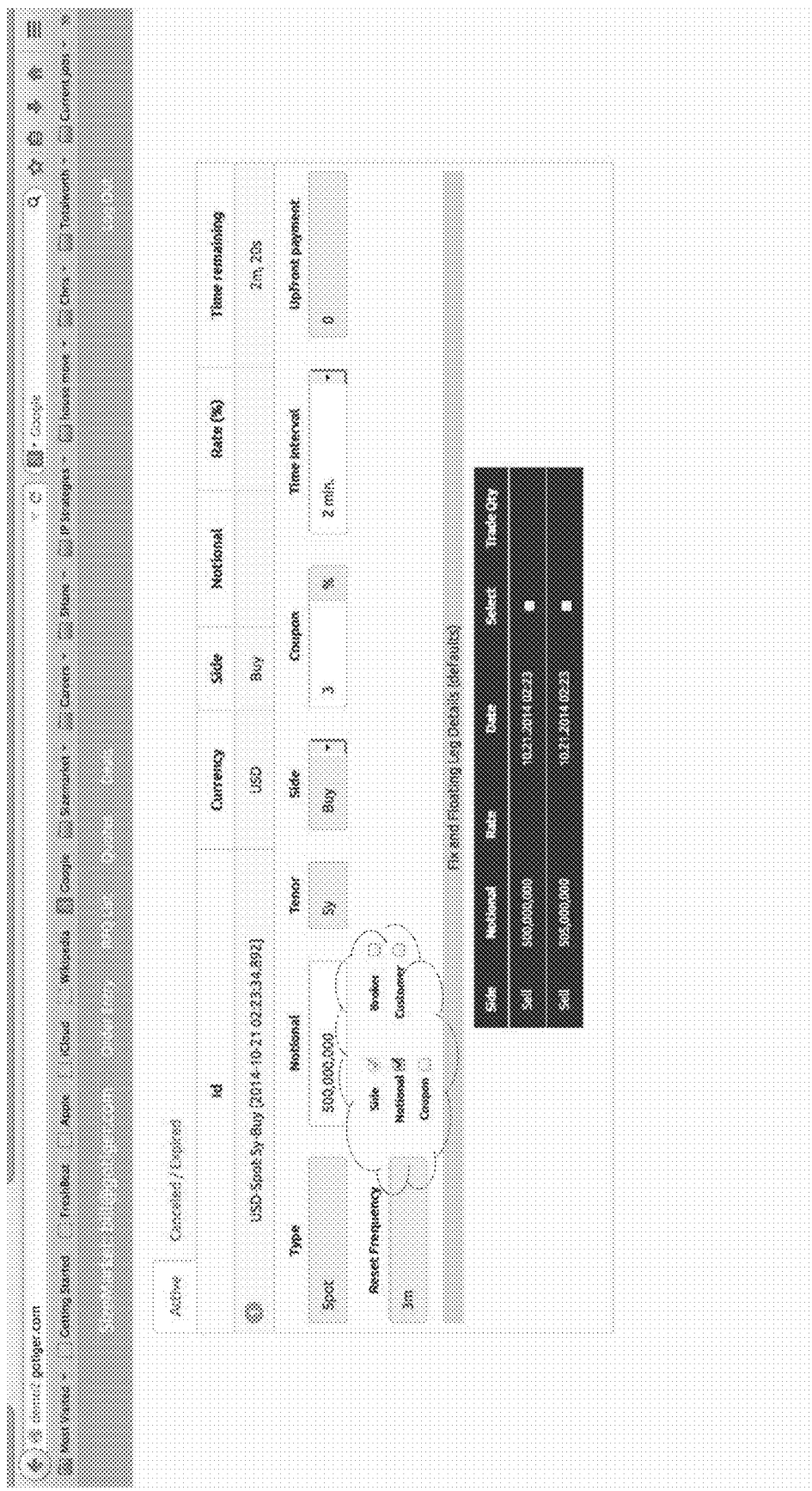

As highlighted in FIG. 19, the User may select the information that may be disclosed to participants during the Second or subsequent Stage of the transactional process.

Figure 20:
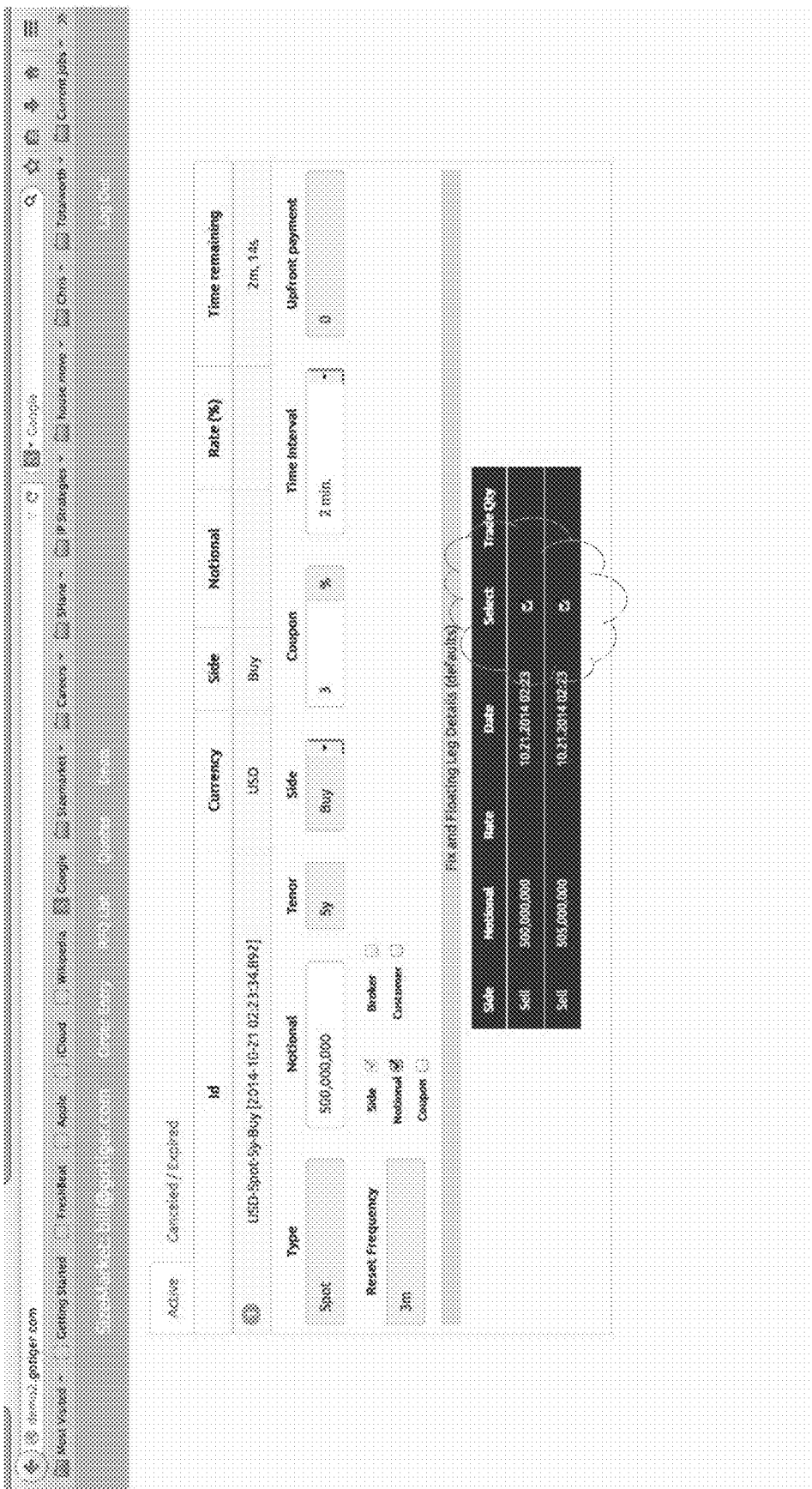

As highlighted in FIG. 20, the User may select the participants that may receive the disclosures for the Second or subsequent Stage of the transactional process.

Figure 21:
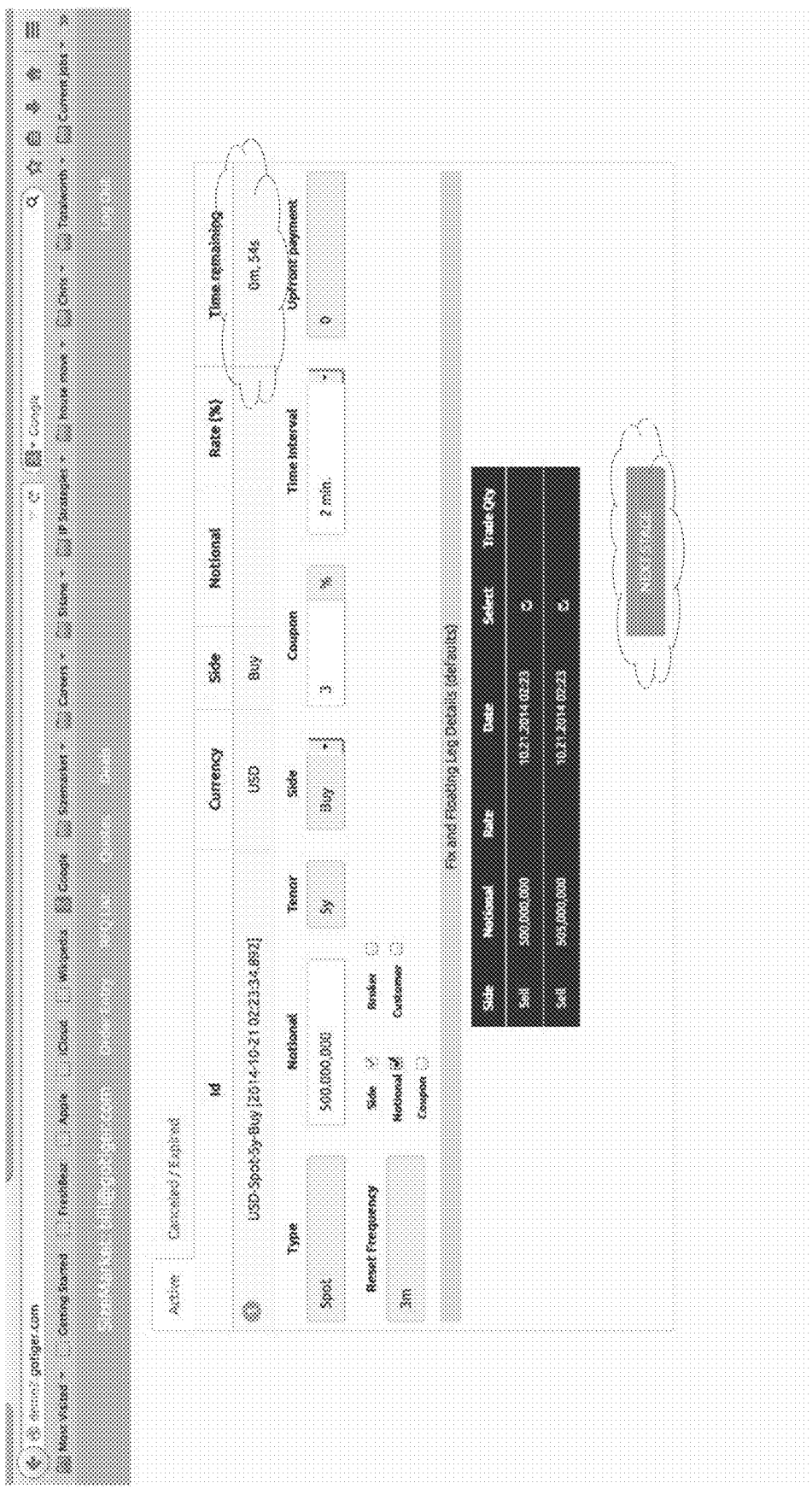

As highlighted in FIG. 21, once the required response time has elapsed under the Remaining Section of the Order Summary Screen, the User may have additional time (which in some embodiments may be determined by the operator of the System platform) in which to finalize disclosure and participant selections. Also, as highlighted in FIG. 21, the User may begin the Second or subsequent Stage of the transactional process by clicking on the "Next Stage" icon.

Figure 22:
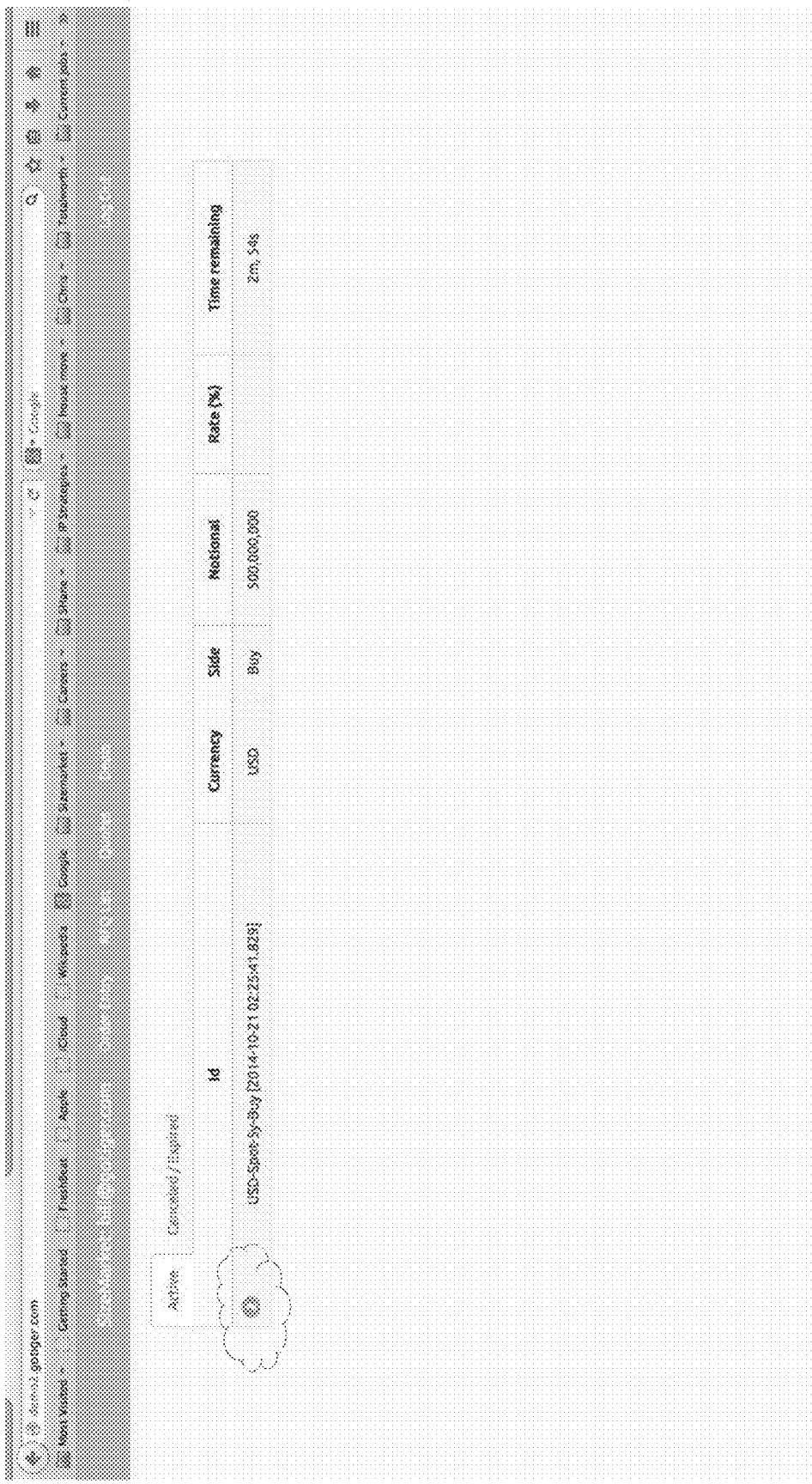

Clicking on the "Next Stage" icon of the Order Summary Screen depicted in FIG. 21 brings the User to a new Order Summary Screen related to the next Stage of the transactional process. FIG. 22 depicts the Order Summary Screen for the Second Stage of the transactional process of the present embodiment. The numeral "2" which is highlighted in FIG. 22 indicates that the Order Summary Screen is displaying information related to the Second Stage of the current transactional process.

In accordance with the embodiment depicted in FIG. 22, when the User proceeds to a subsequent Stage in the transactional process (in this embodiment the Second Stage), the details of the preceding Stage (in this embodiment the First Stage) may no longer be available and the Second Stage may be summarized along with the summaries of other outstanding orders. The User may be shown the current stage and may click on a Summary Line (Line "2" highlighted in FIG. 22) to see the details of the current stage, and prepare for the next stage of the transactional process. Alternatively, in some embodiments of the invention, the details of preceding Stages may be made available to one or more of the parties utilizing the apparatus, system and method of the present invention.

Figure 23:
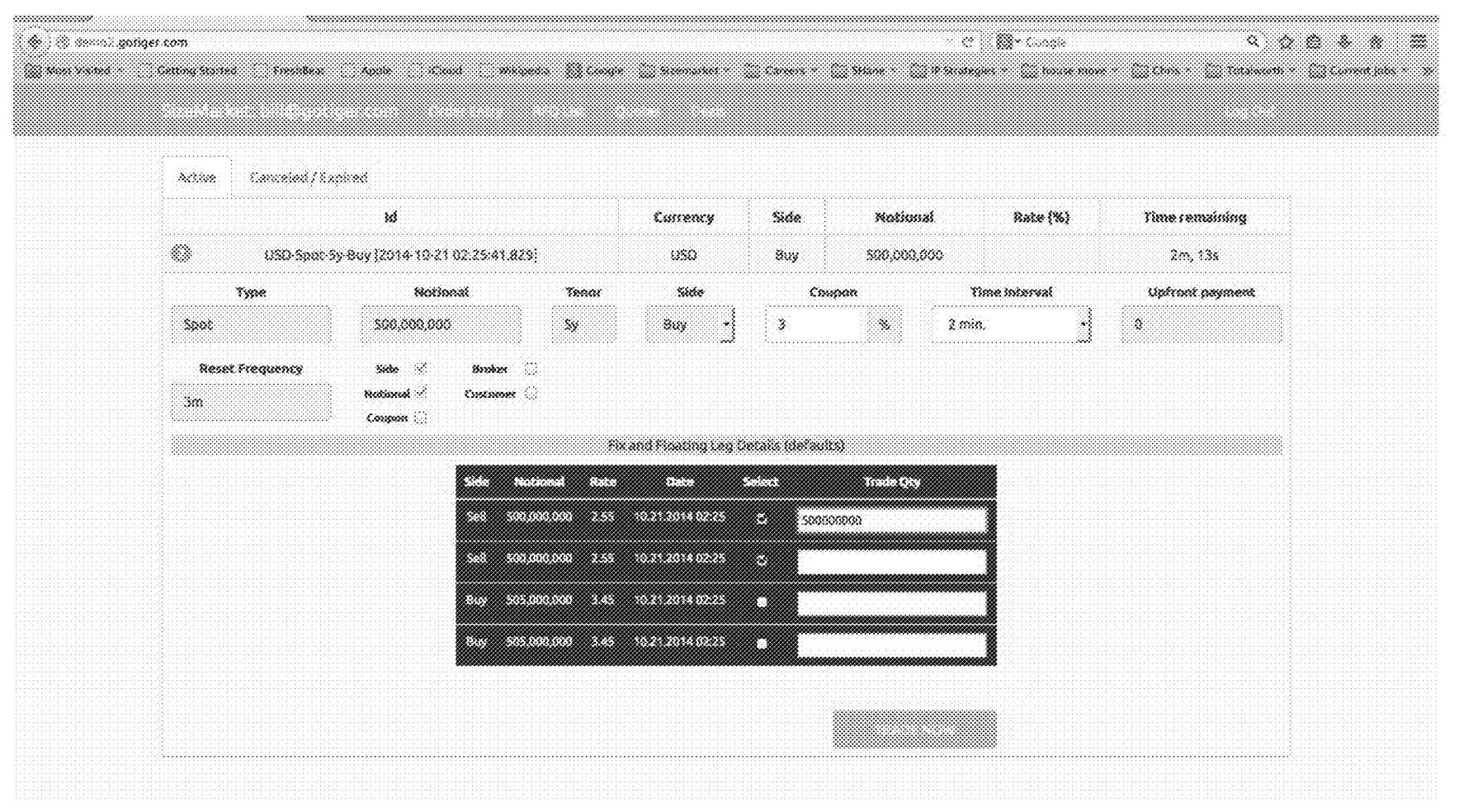

As depicted in FIG. 23, when a User proceeds to the next Stage of the transactional process, the details of the First or previous Stage may no longer be available, and the Second or current Stage may be summarized along with the summaries of other outstanding orders. The User may be shown the current Stage, and may click on the Summary Line to see the details of the current Stage and prepare for the next Stage of the transactional process.

Figure 24:
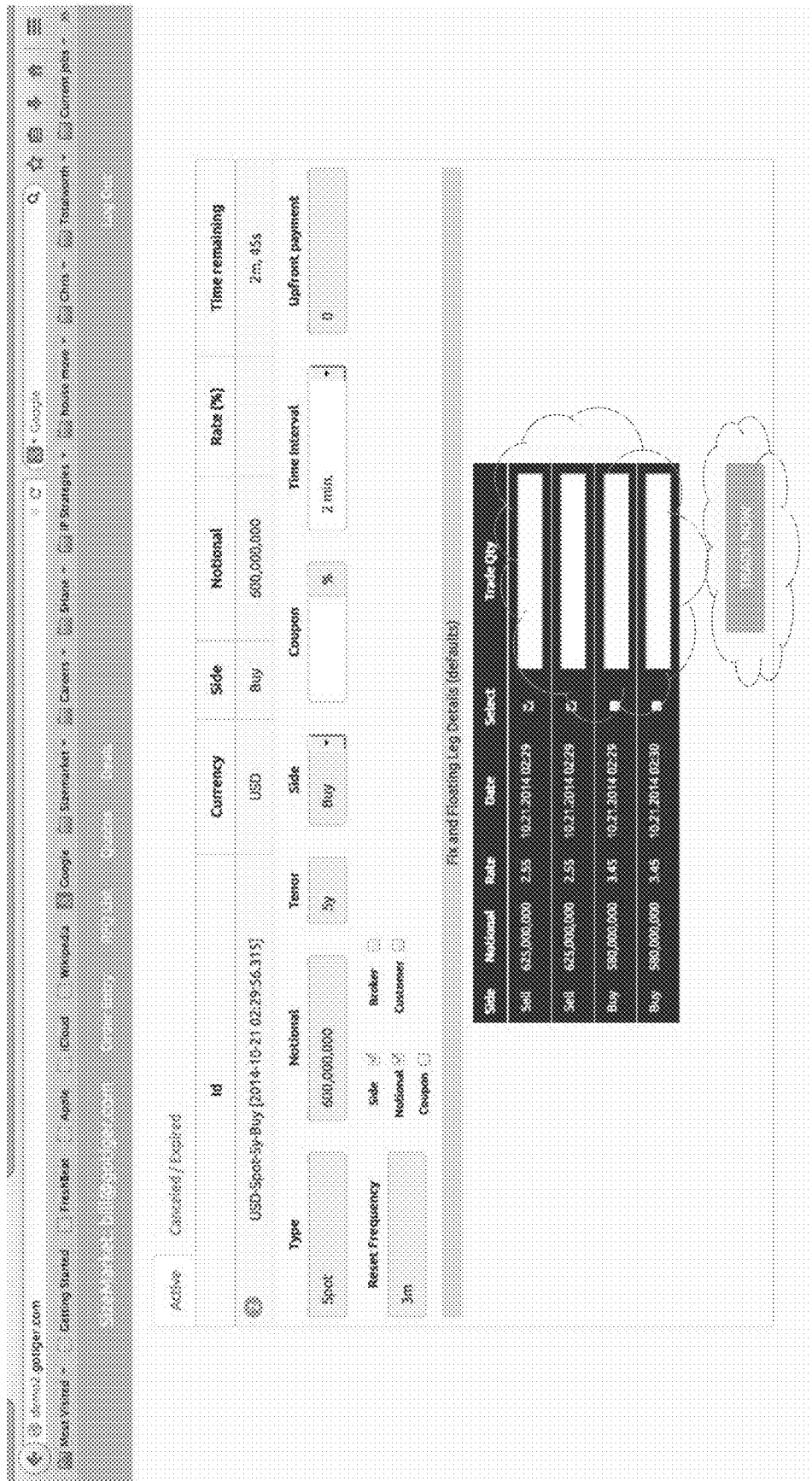

As highlighted in FIG. 24, the User may determine and select which Users may receive the Order, request disclosures, and have the right to respond to such Orders during the next Stage of the transactional process. When Responders have provided tradable responses and/or responses which meet the parameters of a trade offer, in the embodiment depicted in FIG. 24, the User may be presented with a field to input "Trade Quantity" and to initiate and/or execute the trade by checking or selecting a "Select" box associated with a trade offer, and clicking on the "Trade Now" icon highlighted in FIG. 24.

If the User does not initiate a trade based upon existing responses and/or offers, the User may elect to disclose more information (including, but not limited to, desired trade price) to the other parties, in order to solicit better responses from Responders. As highlighted in FIG. 25, such Responders may be selected by selecting the "Select" checkbox associated with such Responders, and making the request for such responses in a subsequent stage of the transactional process by clicking the "Next Stage" icon in the Order Summary Screen highlighted in FIG. 25.

Figure 25:
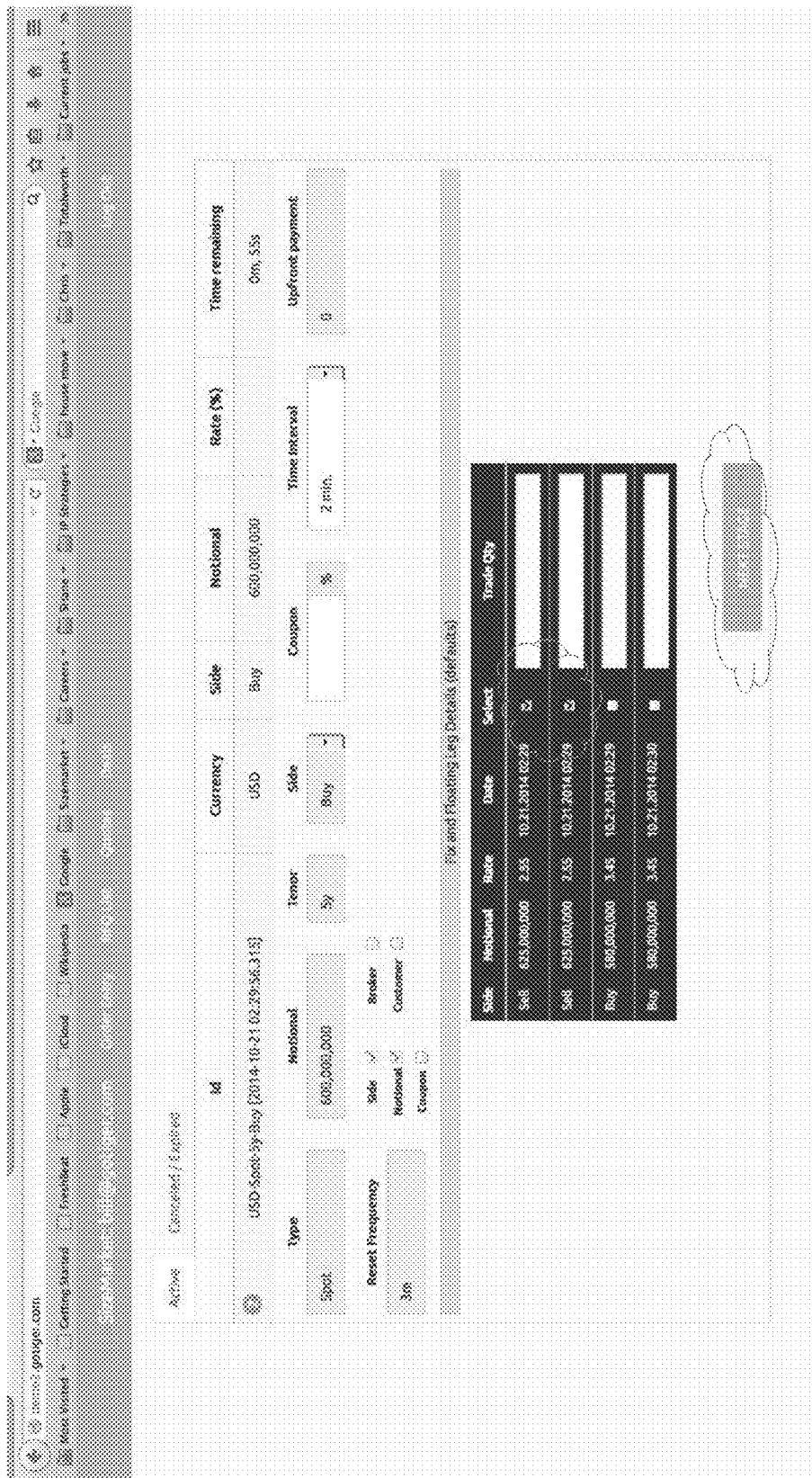
Figure 26:
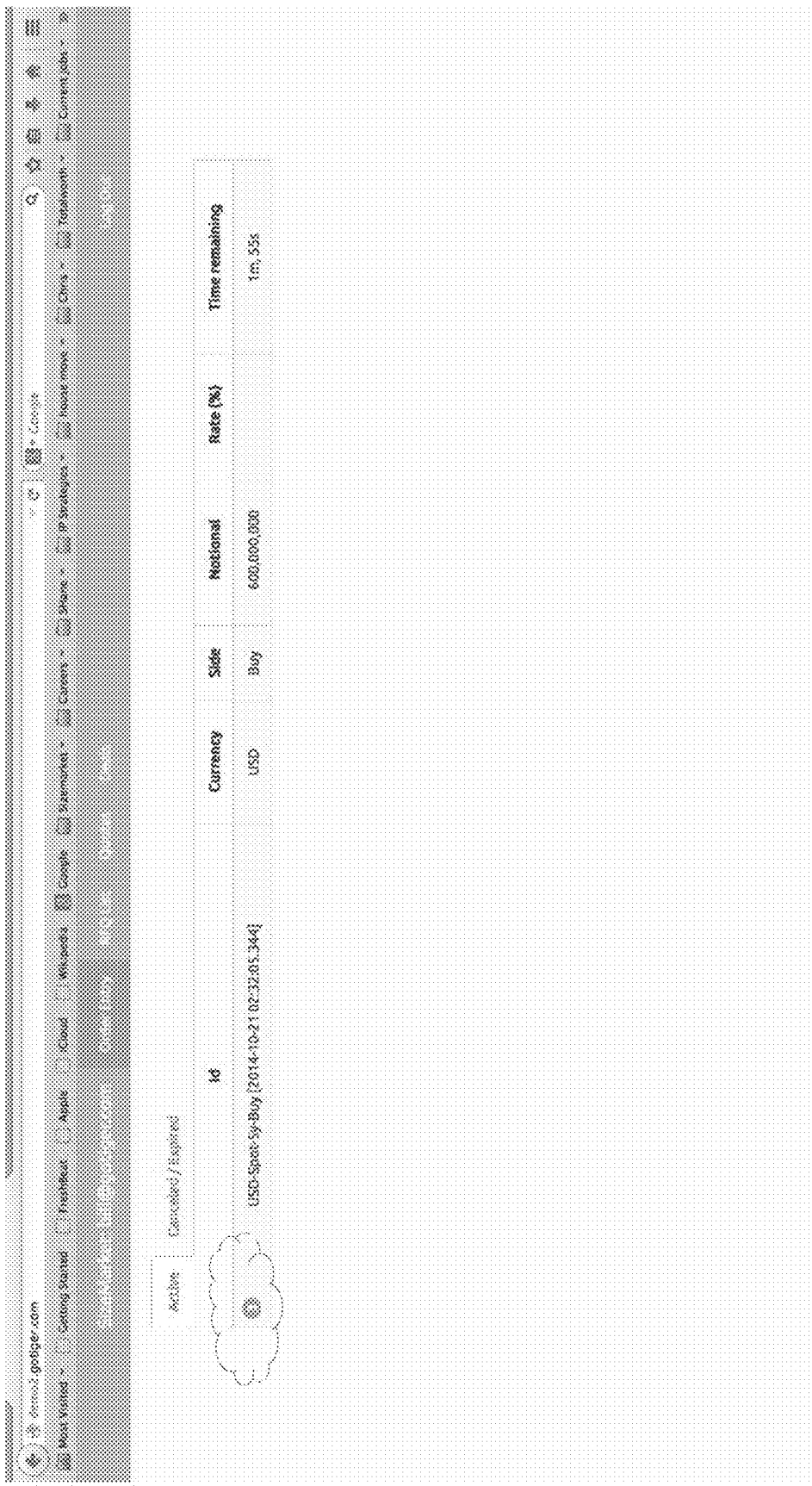

Clicking on the "Next Stage" icon of the Order Summary Screen depicted in FIG. 25 brings the User to a new Order Summary Screen related to the next Stage of the transactional process. FIG. 26 depicts the Order Summary Screen for the Third Stage of the transactional process of the present embodiment. The numeral "3" which is highlighted in FIG. 26 indicates that the Order Summary Screen is displaying information related to the Third Stage of the current transactional process.

In accordance with the embodiment depicted in FIG. 26, when the User proceeds to a subsequent stage in the transactional process (in this embodiment the Third Stage), the details of the preceding Stage (in this embodiment the Second Stage) may no longer be available and the Third Stage may be summarized along with the summaries of other outstanding orders. The User may be shown the current Stage and may click on a Summary Line (Line "3" highlighted in FIG. 26) to see the details of the current Stage, and prepare for the next Stage of the transactional process.

As depicted in FIG. 26, when a User proceeds to the next Stage of the transactional process, the details of the previous Stage may no longer be available, and the current stage may be summarized along with the summaries of other outstanding orders. The User may be shown the current stage, and may click on the Summary Line to see the details of the current Stage and prepare for the next Stage of the transactional process.

Figure 27:
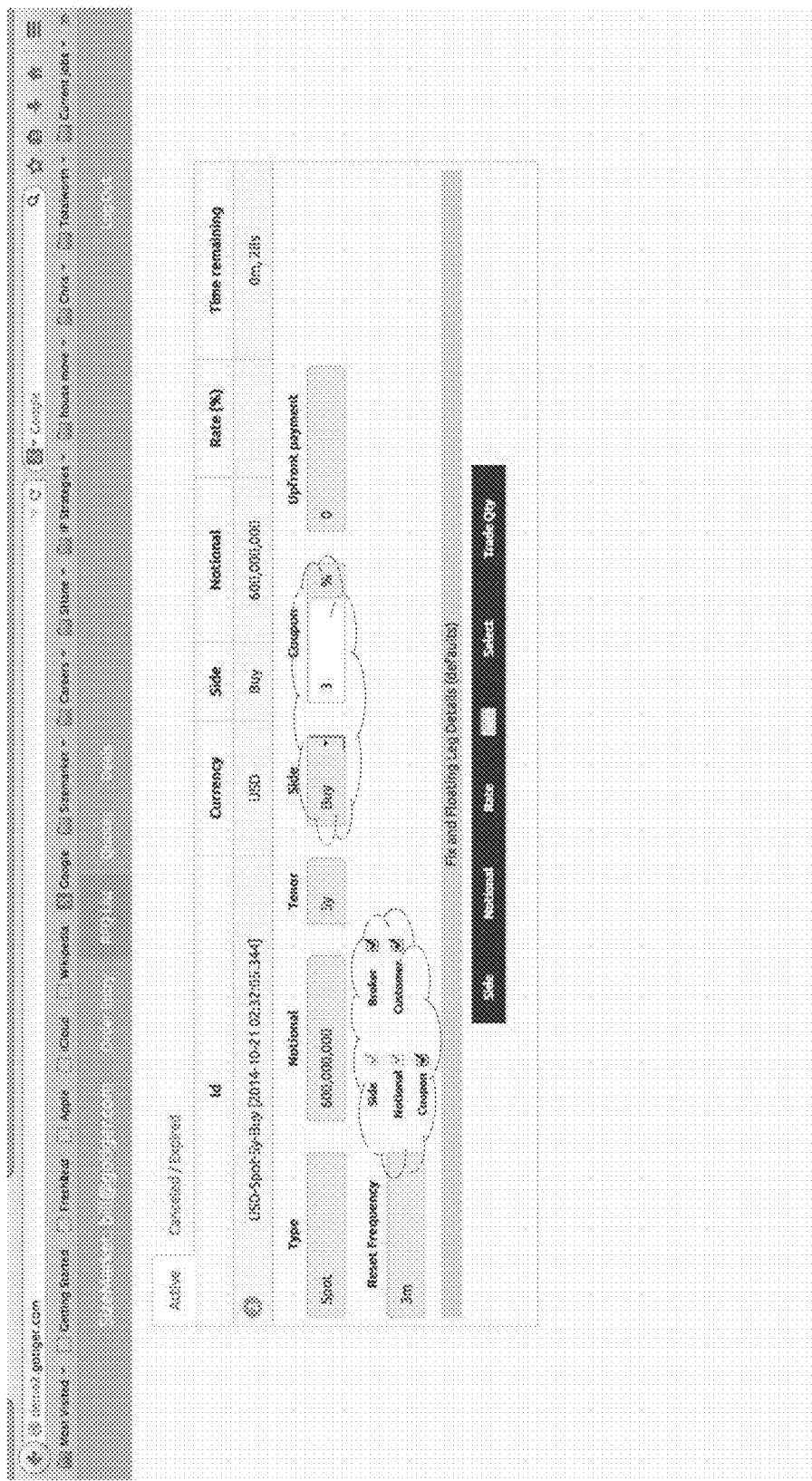

As highlighted in FIG. 27, the User may then input into the Order Summary Screen the desired Third Stage price offering in the "Coupon" field, as well as indicate the information to be disclosed by checking the desired Disclosure check boxes. To the extent that certain information has previously been disclosed, and as shown in FIG. 27, the Disclosure check boxes associated with such information will be inoperative as indicated by graying out such previously disclosed selections.

Figure 28:
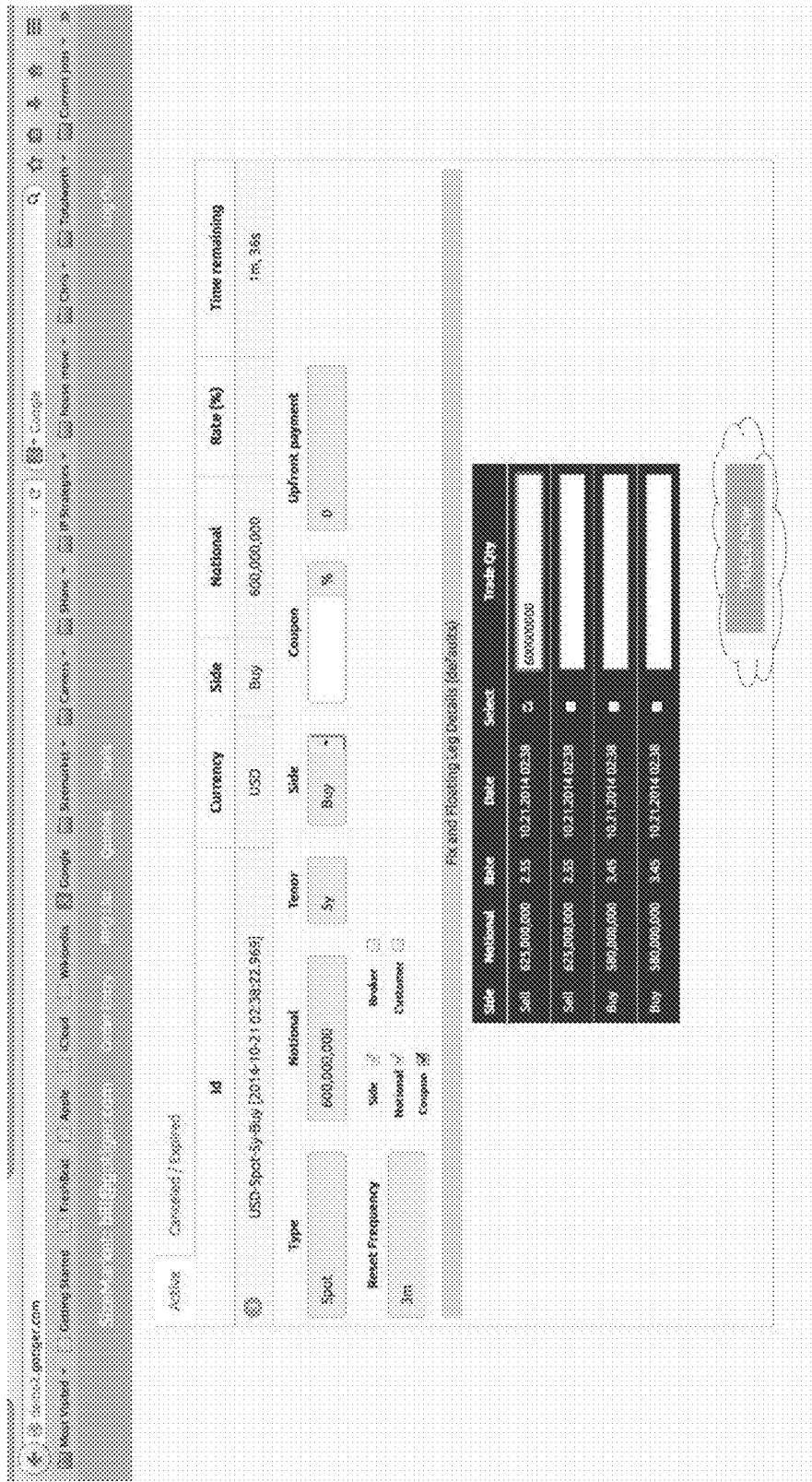

As shown in FIG. 28, the User may determine and select which Users may receive the Order, request disclosures, and have the right to respond to such Orders during the next Stage of the transactional process. When responders have provided tradable responses and/or responses which meet the parameters of a trade offer, in the embodiment depicted in FIG. 28, the User may be presented with a field to input "Trade Quantity" and to execute the trade by checking or selecting a "Select" box associated with a trade offer, and clicking on the "Trade Now" icon highlighted in FIG. 28.

If the User does not initiate or execute a trade based upon existing responses and/or offers, the User may elect to disclose more information (including, but not limited to, desired trade price) to the other parties, in order to solicit better responses from Responders, or the User may elect to allow the Offer to expire without consummating a trade.

The process depicted in FIG. 2 through FIG. 28 may continue for as many Stages as desired until a trade is agreed upon and executed, or the parties involved in the negotiation and/or transaction do not respond to a pending offer, and/or resolve to withdraw from engaging in the negotiation and/or transaction.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. A system for anonymously executing a negotiated transaction for buying and selling products, services and financial instruments directly between two or more parties where one or more parties to said negotiated transaction, as one or more disclosing parties, progressively and anonymously discloses at select times during said negotiated transaction select information to one or more other parties to said negotiated transaction, as one or more receiving parties, in which said progressive and anonymous disclosure advances said negotiated transaction to conclusion, said system comprising:

two or more user interfaces; and a computerized processing device in operative communication with said two or more user interfaces, said computerized processing device comprising:

a processor; and
memory storing said information related to said negotiated transaction and software instructions, said software instructions when executed by said processor causes said processor to perform operations comprising:
anonymously receiving via each user interface of said two or more user interfaces, over a network and from a computerized device associated with one of said two or more parties to said negotiated transaction, information related to said negotiated transaction input by said one of said two or more parties to said negotiated transaction, wherein each user interface is associated with one or more aliases associated with each said one of said two or more parties to said negotiated transaction;
anonymously and iteratively disseminating, over said network via one or more of said two or more interfaces to said one or more computerized devices associated with said one or more of said two or more parties to said negotiated transaction, information input by said one or more disclosing parties as said one or more receiving parties, said information related to said negotiated transaction received over said network via one or more of the two more interfaces from said one or more computerized devices associated with said one or more of said two or more parties to said negotiated transaction, as said one or more disclosing parties, at a time determined by said one or more disclosing parties;
wherein anonymously and iteratively disseminating information comprises:
controlling, as a controlled disclosure, said one or more disclosing parties' iterative and contemporaneous disclosure of select information specific to each of said one or more receiving parties' as selected by said one or more disclosing parties;
maintaining the anonymity of each party until the conclusion of the negotiated transaction;
controlling disclosure of multilateral subsets of said information disclosed from each of said one or more disclosing parties under at least one alias allowing each said party to said transaction to maintain said party's competitive advantage by maintaining said party's anonymity throughout said transaction; and
anonymously disclosing said controlled disclosure to said designated receiving parties in response to said disclosing party's input via said user interface.

2. The system of claim 1, said memory storing additional software instructions that when executed by said processor causes said processor to perform operations comprising:
establishing a time limit for a receiving party to provide a response to said controlled disclosure.

3. The system of claim 1, said memory storing additional software instructions that when executed by said processor causes said processor to perform operations comprising:
wherein controlling disclosure comprises requiring a response from a receiving party to accept or reject said negotiated transaction.

4. The system of claim 1, said memory storing additional software instructions that when executed by said processor causes said processor to perform operations comprising:
wherein controlling disclosure comprises requiring a response from a receiving party to provide additional information to said disclosing party.

5. The system of claim 1, said memory storing additional software instructions that when executed by said processor causes said processor to perform operations comprising:
wherein controlling disclosure comprises requiring said disclosing party to provide to a receiving party an offering price associated with said negotiated transaction.

6. The system of claim 1, said memory storing additional software instructions that when executed by said processor causes said processor to perform operations comprising:
wherein controlling disclosure comprises requiring a receiving party to provide said disclosing party with a counter offering price to an offering price associated with said negotiated transaction offered by said disclosing party.

7. The system of claim 1, said memory storing additional software instructions that when executed by said processor causes said processor to perform operations comprising:
wherein controlling disclosure comprises requiring said disclosing party to provide to a receiving party an offering price associated with said negotiated transaction, and said receiving party to accept or reject said offering price associated with said negotiated transaction within an established period of time.

8. The system of claim 1, said memory storing additional software instructions that when executed by said processor causes said processor to perform operations comprising:
wherein controlling disclosure comprises requiring a receiving party of an offering price associated with said negotiated transaction offered by said disclosing party to provide said disclosing party with a counter offering price to said offering price offered by said disclosing party within an established period of time.

9. The system of claim 1, said memory storing additional software instructions that when executed by said processor causes said processor to perform operations comprising:
wherein controlling disclosure comprises requiring said disclosing party and a receiving party to contemporaneously disclose to said other party to said transaction additional information associated with said negotiated transaction.

10. The system of claim 1, said memory storing additional software instructions that when executed by said processor causes said processor to perform operations comprising:
wherein controlling disclosure comprises requiring said disclosing party and a receiving party to contemporaneously disclose to said other party to said transaction additional information associated with said negotiated transaction, wherein said additional information contemporaneously disclosed comprises information of differing type.

11. The system of claim 1, said memory storing additional software instructions that when executed by said processor causes said processor to perform operations comprising:
wherein controlling disclosure comprises requiring said disclosing party and a receiving party to contemporaneously disclose to said other party to said transaction additional information associated with said negotiated transaction, wherein said additional information contemporaneously disclosed comprises information of differing scope.

* * * * *